(12) United States Patent
Katayama

(10) Patent No.: US 6,897,867 B2
(45) Date of Patent: May 24, 2005

(54) INFORMATION COMPARISON DISPLAY APPARATUS USING COLORS AND A METHOD THEREOF

(75) Inventor: Yoshinori Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 09/737,734

(22) Filed: Dec. 18, 2000

(65) Prior Publication Data

US 2001/0004402 A1 Jun. 21, 2001

(30) Foreign Application Priority Data

Dec. 17, 1999 (JP) .......................................... 11-358564

(51) Int. Cl.⁷ .............................................. G06T 11/20
(52) U.S. Cl. ...................... 345/440; 345/589; 345/593; 715/528
(58) Field of Search ................................ 345/440, 589, 345/593; 382/162, 165, 168; 715/528

(56) References Cited

U.S. PATENT DOCUMENTS

| | | | | |
|---|---|---|---|---|
| 5,416,890 A | * | 5/1995 | Beretta ........................ | 345/590 |
| 5,574,837 A | * | 11/1996 | Clark et al. .................. | 345/440 |
| 5,596,703 A | * | 1/1997 | Eick et al. ................... | 345/700 |
| 5,664,084 A | * | 9/1997 | Smith .......................... | 345/440 |
| 5,739,824 A | * | 4/1998 | Dietrich et al. ............. | 345/440 |
| 5,784,066 A | * | 7/1998 | Aizikowitz et al. .......... | 345/440 |
| 5,787,414 A | * | 7/1998 | Miike et al. .................... | 707/2 |
| 5,794,178 A | * | 8/1998 | Caid et al. ....................... | 704/9 |
| 5,835,625 A | * | 11/1998 | Fitzpatrick et al. ......... | 382/165 |
| 5,918,238 A | * | 6/1999 | Hayashi ....................... | 715/526 |
| 6,057,839 A | * | 5/2000 | Advani et al. .............. | 345/784 |
| 6,100,900 A | * | 8/2000 | Rokusek et al. ............ | 345/440 |
| 6,137,499 A | * | 10/2000 | Tesler .......................... | 345/440 |
| 6,211,880 B1 | * | 4/2001 | Impink, Jr. ................. | 345/418 |
| 6,301,579 B1 | * | 10/2001 | Becker ....................... | 707/102 |
| 6,356,285 B1 | * | 3/2002 | Burkwald et al. .......... | 345/853 |

FOREIGN PATENT DOCUMENTS

JP     A 8-287172     11/1996

* cited by examiner

*Primary Examiner*—Mark Zimmerman
*Assistant Examiner*—Enrique L. Santiago
(74) *Attorney, Agent, or Firm*—Staas & Halsey LLP

(57) ABSTRACT

The present invention uses colors for displaying the results of information retrieval or analysis of pieces of input information so as to allow a user to visually and objectively understand the difference between the pieces of input information and a series of changes. An information comparison display apparatus, according to the present invention, comprises a unit for receiving pieces of input information; a unit for comparing the pieces of input information based on predetermined comparison criteria, and for determining characteristic elements to be assigned colors; a unit for assigning colors to the pieces of input information based on the results of comparison; and a unit for outputting the information, to which the colors have been assigned, to the outside.

8 Claims, 27 Drawing Sheets

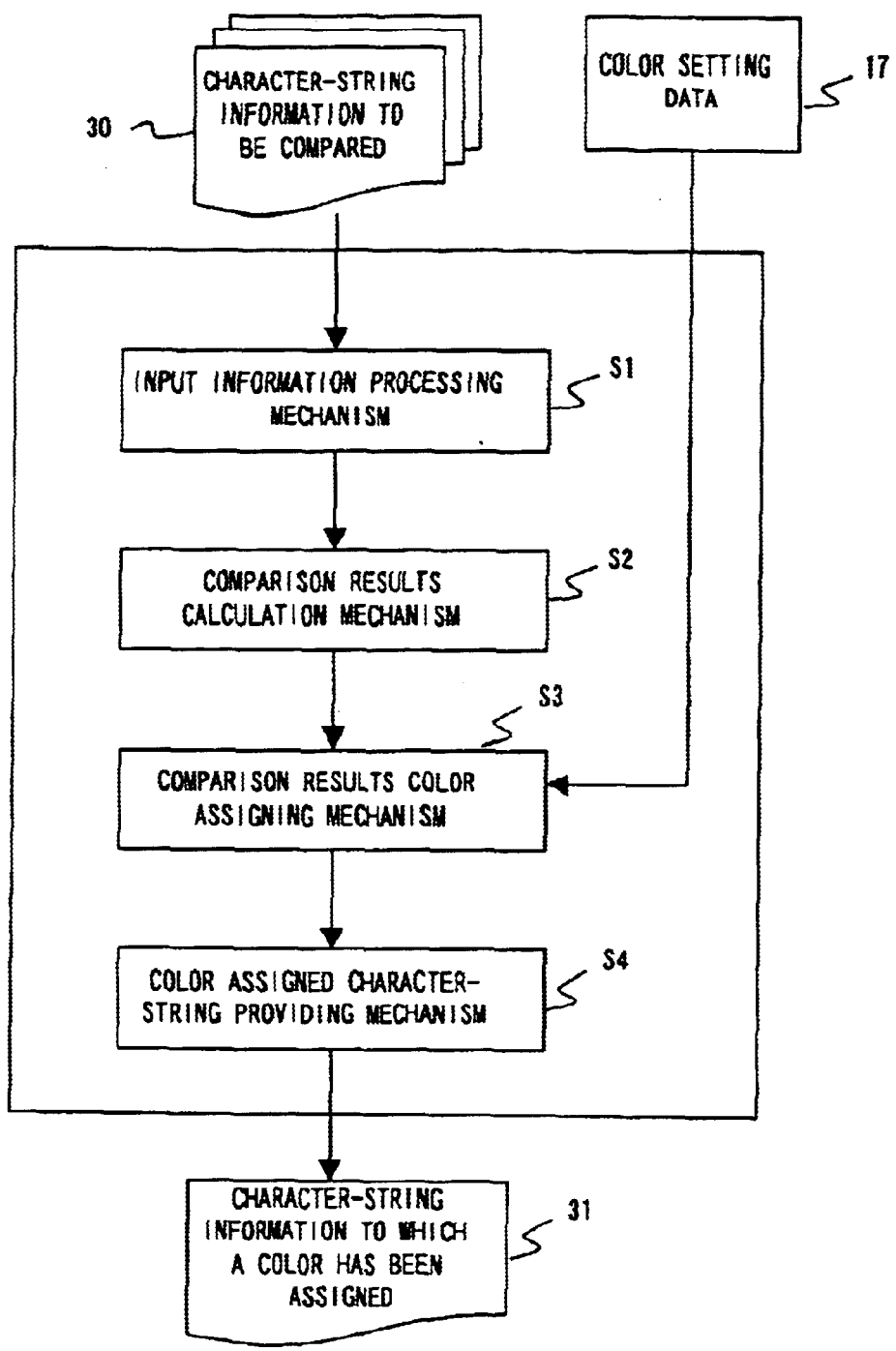
F I G. 8

| FREQUENCY OF OCCURRENCE | BASE COLOR | RGB |
|---|---|---|
| 1 | GRAY | 888888 |
| 2 | BLUE | 0000FF |
| 3 | RED | FF0000 |

F I G. 1 3

| FREQUENCY OF OCCURRENCE | BASE COLOR |
|---|---|
| N (COMMON NODE) | RED |
| N-1 | GREEN |
| N-2 | YELLOW |
| N-3 | LIGHT BLUE |
| . . . . . . | |
| 1 (INHERENT NODE) | GRAY |

FIG. 14

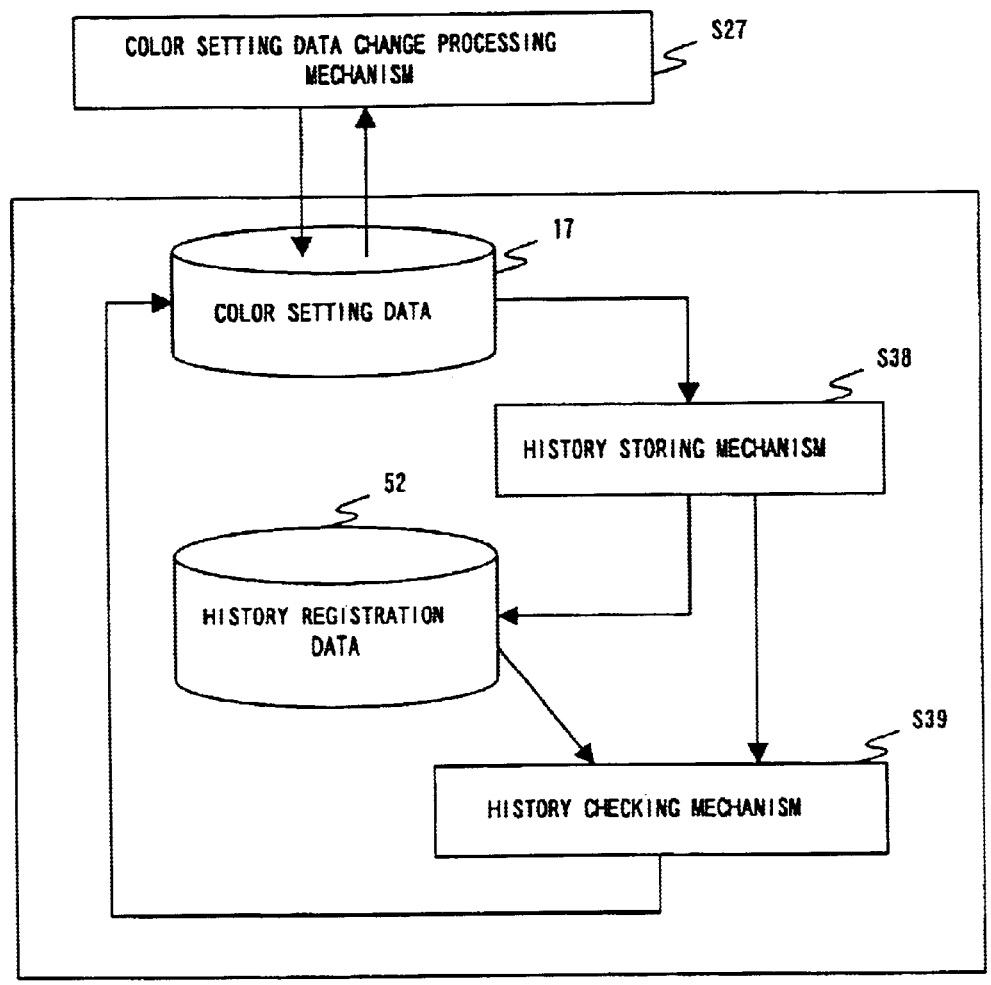
F I G. 2 1

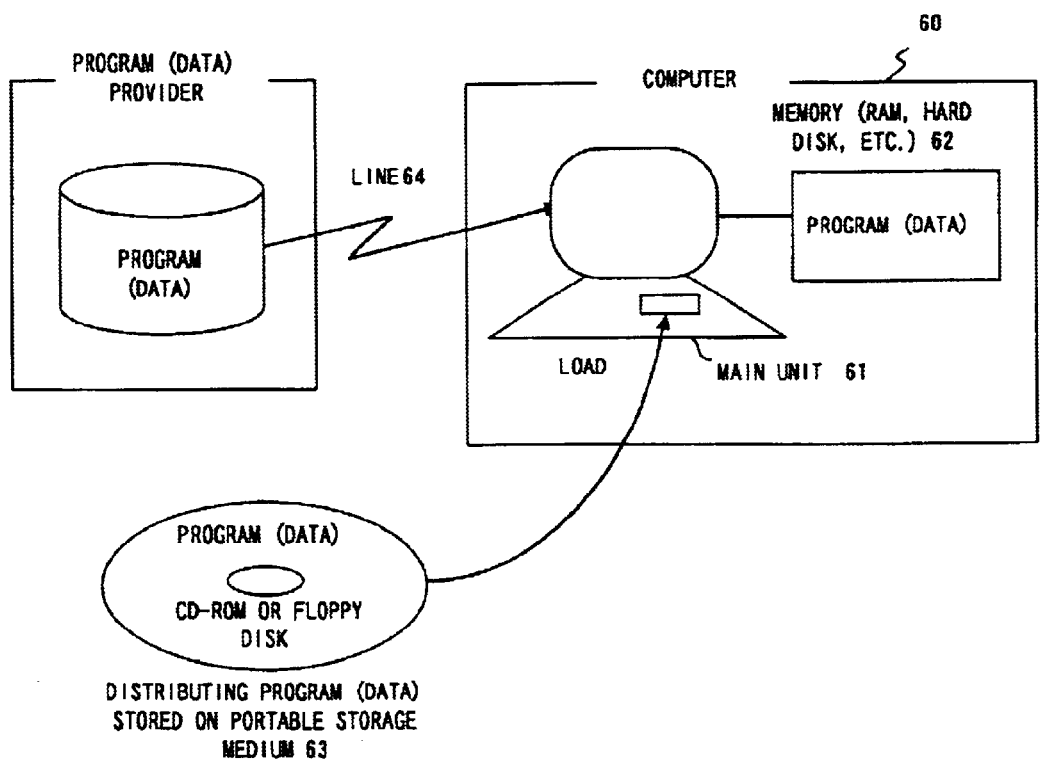
F I G. 2 7

INFORMATION COMPARISON DISPLAY APPARATUS USING COLORS AND A METHOD THEREOF

BACKGROUND OF THE INVENTION

1. Field of the Invention

The present invention relates to an information display apparatus for displaying the results of information retrieval or analysis of input information, and more specifically to an information comparison display apparatus using colors and a method thereof, in which a color is assigned to each piece of character-string information according to the results of comparison of the pieces of character-string information. Each piece of character-string information is outputted together with the assigned color so as to clearly visualize the results of the comparison.

2. Description of the Related Art

In general, the method of determining a presentation unit in accordance with the structure of target information becomes important when pieces of input information are compared and the difference between the pieces of input information is displayed. For example, in cases where the structure and meaning of input information is specified in advance, such as a case of a software program, it is necessary to reflect the structure and meaning of the information in comparison results represented by a display object so as to allow a user to easily understand the comparison results. Thus, instead of simply displaying the difference between the pieces of input information, consideration must be given to the method of determining a presentation unit of the comparison results.

However, in the case of the comparison of pieces of character-string information, to which the present invention is mainly directed, a unit having a definite form, such as a piece of text or a word, becomes a presentation unit of a comparison result. Generally, the following three conventional methods are used for displaying the results of information retrieval or analysis of information, and for displaying the comparison of the results: a first method, in which results are displayed and a user compares the displayed results; a second method, in which a characteristic part of results are extracted and presented to a user; and a third method, in which a mark is put on a different part or common part of results and only the marked part is displayed.

FIGS. 1–3 show an example of the comparison of pieces of character-string information using the conventional method. FIGS. 1 and 2 show the relationship between systems of 1995 and those of 1999, respectively. The diagrams as shown in FIGS. 1 and 2 are formed with elements enclosed in a box, which indicate character-string information, and lines indicating the relationship between the elements. These diagrams correspond to the above-mentioned first method. Comparison between FIGS. 1 and 2 allows a user to make a comparison between the systems of 1995 and 1999.

FIG. 3 corresponds to the above-mentioned second method. A part common to FIGS. 2 and 3 is extracted and displayed in FIG. 3. FIG. 3 allows a user to understand the difference between two pieces of input information.

Thus, in the conventional methods, a user can only understand the difference between pieces of input information and a common part of the pieces of input information, thus the viewpoint or aim of the display of results remains unclear. Therefore, the results cannot always be understood easily, and furthermore, there is a possibility that an omission occurs. In cases where three or more pieces of input information are compared, it is difficult to understand the results of comparison between two of the pieces of input information.

That is, simply displaying the difference between pieces of input information only allows a user to partly understand the input information, and does not allow the user to fully understand the input information. It is necessary to clarify the characteristic of each part of input information in relation to the entire input information to make the user to fully understand the input information. For example, in a retrieval system, output results are ranked and displayed according to the frequency of occurrence of a keyword. However, if comparison results regarding only part of input information are presented to a user, the user cannot obtain overall ranking information.

For example, if a mark is put on an element of input information so as to make a distinction between elements, the characteristic of compared parts of the input information can only be seen from a single point of view. The use of different marks indicating a plurality of viewpoints is likely to result in the user misunderstanding or misinterpreting the information. In general, the results of information retrieval are displayed by marking a retrieval keyword. However, a mark cannot be effectively used for graphically displaying the relationship between retrieval results or for comparing the retrieval results.

FIG. 4 shows another example of the graphical visualization of the comparison results of character-string information, based on the conventional method. Three words displayed in the search term priorities section in the lower left corner of the screen image as shown in FIG. 4, are used as keywords in retrieval. The three keywords are displayed in the center of the right side of the screen image, and words relevant to the keywords are displayed around the keywords. A user can create a new retrieval condition by selecting a new keyword from among the displayed words relevant to the keywords.

In some cases, colors are used for displaying the comparison results of character-string information, so as to visually emphasize or highlight the comparison results. However, there is no example of using colors for indicating the results of comparison or the difference between pieces of information. For example, in a retrieval system, colors are used so that a user can easily understand the position where a retrieval key appears, but are not used for making the user understand differences or changes. In some cases of graphical representation, nodes of different forms are used for indicating the difference in quantity. However, such conventional graphical representation does not use colors for indicating the comparison or difference between pieces of information.

As described above, in the case of comparison between pieces of character-string information, a piece of text or word is used as a presentation unit of comparison results. However, extracting only a characteristic part or displaying elements which are simply arranged is not sufficient to make a user understand comparison results well, resulting in that the user cannot easily understand the difference between pieces of information. In the case of inputting a series of character-string information, such as time-series information, it is desirable to indicate a series of changes in displaying comparison results. However, it is difficult to display such a series of changes in a manner in which a user can easily understand the series of changes.

Although the technique for representing a relationship by means of a graph and the technique for using colors only as marks already exist, there is no technique for using colors for indicating the results of comparison or difference between pieces of character-string information. Thus, the conventional method has the problem that the results of comparison or difference between pieces of input information cannot be easily understood.

SUMMARY OF THE INVENTION

An object of the present invention is to provide an information comparison display apparatus using colors and a method thereof, which has an important function of using colors for indicating the results of comparison or the difference between pieces of input information, and which displays the results of information retrieval or analysis of pieces of input information by using colors for indicating differences and a series of changes so that a user can visually and objectively understand these results.

That is, an information comparison display apparatus according to the present invention, which displays the results of comparison between pieces of input information by using colors, comprises an input information processing unit which receives the pieces of input information; an information comparing unit, which determines characteristic elements to be assigned a color by comparing the pieces of input information based on predetermined comparison criteria; a color assigning unit, which assigns a color corresponding to a preset default value or a color defined by each user, to each of the pieces of input information; and a color-assigned information providing unit, which outputs the information to which a color is assigned, to the outside.

For example, the input information processing unit receives pieces of input information, and extracts common items, such as common keywords, from the pieces of input information. The information comparing unit determines characteristic elements to be assigned a color based on the predetermined comparison criteria, and arranges color data to be used for displaying each keyword according to the number of common items such as common keywords, based on the elements. The color assigning unit assigns the pieces of input information the color data which are arranged by the information comparing unit according to keywords. That is, the color assigning unit assigns a color corresponding to a preset default value or a color defined by every user, to each of the pieces of input information. The color-assigned information providing unit outputs the information, to which a color has been assigned, to the outside. In other words, the color-assigned information providing unit outputs information, to which a color has been assigned by performing a process in cooperation with another system such as a retrieval system, as display data in a form suitable for the other system.

As described above, the present invention displays the results of comparison between pieces of input information by using colors, thereby allowing a user to easily understand these results and to freely change colors to be assigned to the results of comparison in accordance with the user's preferences regarding a color or the aim of the comparison.

In the present invention, not only the color data corresponding to default values stored in a system, but also neutral colors or gradations in color can be used for displaying the trend of transition between a series of related information, thereby allowing a user to easily understand the complex trend of the transition.

BRIEF DESCRIPTION OF THE DRAWINGS

FIG. 8 is a flowchart showing a flow of an overall process of the information comparison display apparatus using colors according to the present invention;

FIG. 13 shows the basic data structure of color setting data;

FIG. 14 shows another example of color setting data;

FIG. 21 illustrates a process for automatically registering a color;

FIG. 27 illustrates the loading of a program into a computer for implementing the present invention.

DESCRIPTION OF PREFERRED EMBODIMENT

First, the basic configuration of the present invention is explained.

Figure 5:
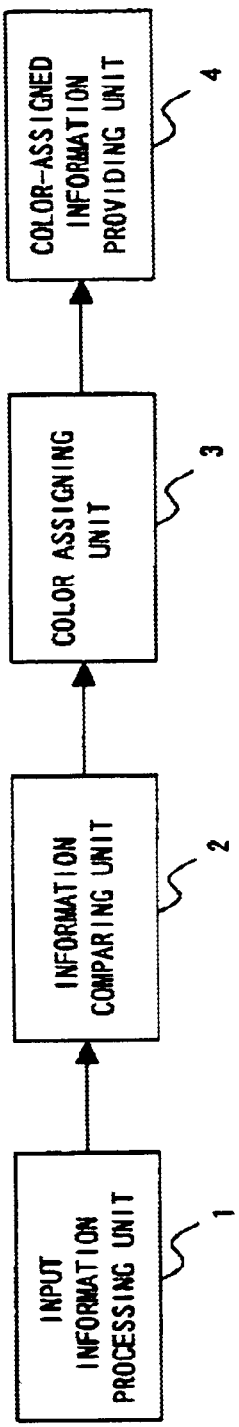
FIG. 5 is a block diagram showing the basic configuration of the present invention.

FIG. 5 is a block diagram showing the basic configuration of the present invention. In other words, FIG. 5 is a block diagram showing the basic configuration of an information comparison display apparatus using colors, which displays the results of comparison between pieces of input information such as character-string information.

In FIG. 5, an input information processing unit 1 is, for example, an input information processing mechanism for receiving pieces of input information and extracting common items, such as common keywords, from the pieces of input information.

An information comparing unit 2 is, for example, a comparison results calculation mechanism for determining characteristic elements to be assigned a color based on predetermined comparison criteria, and for arranging color data to be used for displaying each keyword according to such elements as the number of common items. A color assigning unit 3 assigns the color data corresponding to, for example, each keyword, which are arranged by the information comparing unit 2, to each of the pieces of input information. In other words, the color assigning unit 3 assigns a color corresponding to a preset default value or a color defined by each user, to each of the pieces of input information.

A color-assigned information providing unit 4 outputs the information, to which a color has been assigned, to the outside. That is, the color-assigned information providing unit 4 outputs information, to which a color has been assigned in cooperation with another system such as a retrieval system, as display data in a format suitable for the other system.

In an embodiment of the present invention, pieces of input information, such as character-string information, are compared.

In the embodiment of the present invention, it is possible to configure an apparatus, as follows. The information comparing unit 2 defines common elements, such as common keywords, which are common to the pieces of input information as elements to be assigned a color. The color assigning unit 3 assigns a color to the common elements.

It is also possible to configure an apparatus so that the information comparing unit 2 defines elements which are not common elements to the pieces of input information as elements to be assigned a color, and the color assigning unit 3 assigns a color to the elements which are not common elements.

In the embodiment of the present invention, it is also possible to configure an apparatus, as follows. The information comparing unit 2 compares pieces of input information corresponding to specified information such as a keyword. The color assigning unit 3 assigns a color to an element corresponding to the specified information such as a keyword. That is, the color assigning unit 3 assigns a specific color to a keyword in a piece of input information, in which the keyword appears a small number of times, and assigns another color to the keyword in another piece of input information, in which the keyword appears many times.

It is possible to further provide the information comparison display apparatus using colors, according to the present invention, with a color changing unit which changes a color defined by a user based on the results of comparison performed by the information comparing unit 2, in response to an input by the user.

In such a case, it is also possible to provide the apparatus with an automatic color registering unit which resets a default value of a color corresponding to the results of comparison, based on a history of the results of a color change by the color changing unit.

In the embodiment of the present invention, input information can be a series of related information such as time-series information. In such a case, it is possible to configure the apparatus so that the color assigning unit 3 assigns a color to input information according to the size of a change, as a result of comparison between a series of input information.

In the embodiment of the present invention, it is also possible to provide the apparatus with a color-assignment data arranging unit for determining a new color or thinning out color data so that the number of pieces of color data agrees with the number of keywords in cases where, for example, the number of keywords does not agree with the number of default values defined in a system or the number of pieces of color data defined for each user.

The information comparison display method, according to the present invention, includes the following steps: receiving pieces of input information; determining characteristic elements to be assigned a color by comparing the pieces of input information, based on predetermined comparison criteria; assigning a color corresponding to a preset default value or a color defined by each user, to each of the pieces of input information, based on the results of comparison; and outputting the information, to which a color has been assigned, to the outside.

In the embodiment of the present invention, it is possible to use a computer-readable portable storage medium as a storage medium for use in an information comparison display apparatus displaying the results of comparison between pieces of input information, the computer-readable portable storage medium recording a program for causing a computer to perform the steps of: receiving pieces of input information; determining characteristic elements to be assigned a color by comparing the pieces of input information, based on predetermined comparison criteria; assigning a color corresponding to a preset default value or a color defined by each user, to each of the pieces of input information, based on the results of comparison; and outputting the information, to which a color has been assigned, to the outside.

The present invention displays the results of comparison between pieces of input information by using colors, thereby allowing a user to easily understand the results of comparison. The present invention also allows a user to freely change colors to be assigned to such comparison results in accordance with the user's preferences regarding colors or the aim of the comparison. Furthermore, in the present invention, not only the color data corresponding to default values stored in a system, but also neutral colors or gradations in color, can be used for displaying the trend of transition between a series of related information, thereby allowing a user to easily understand the complex trend of the transition.

Next, a concrete example is explained below.

Figure 6:
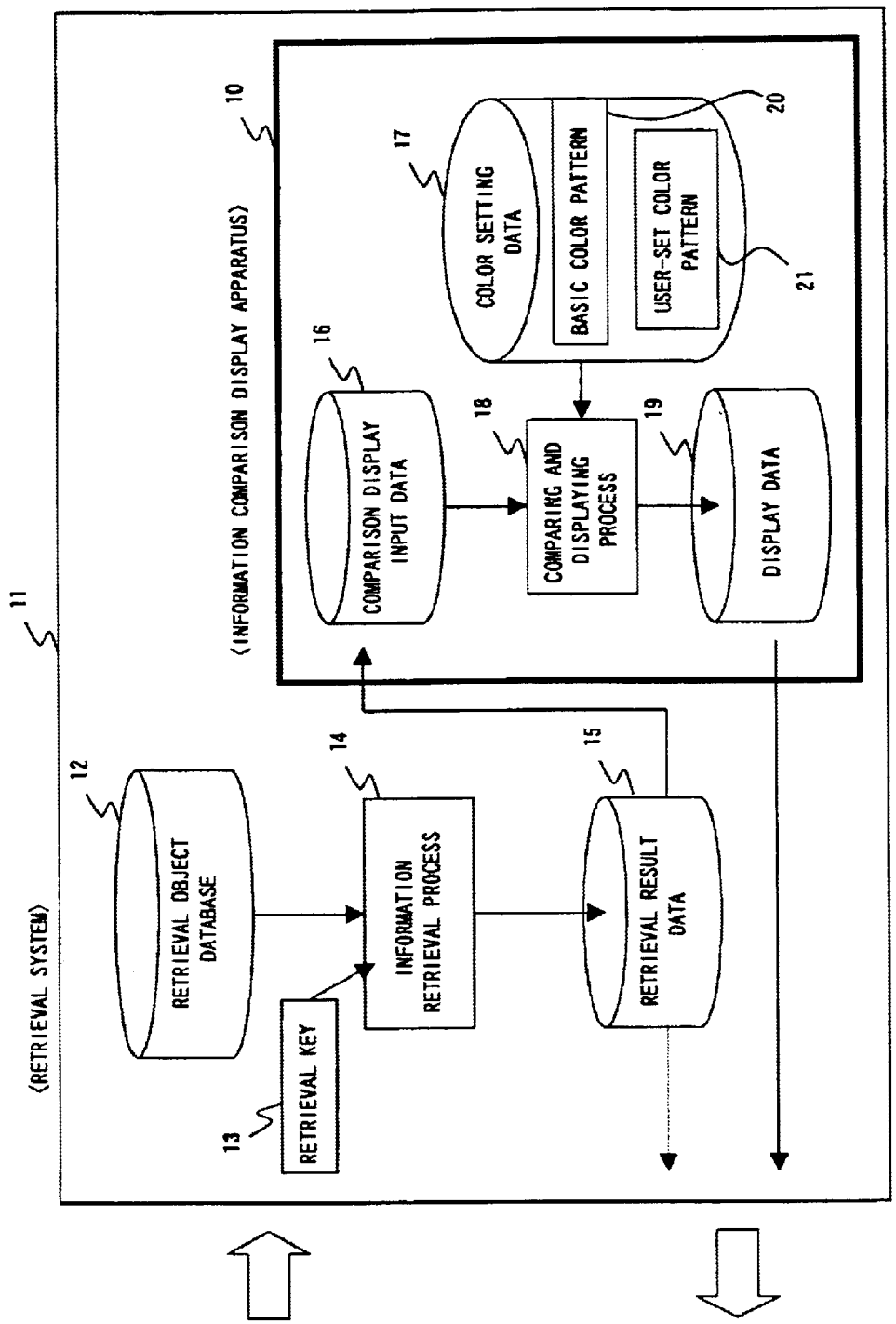
FIG. 6 shows the configuration of a retrieval system including an information comparison display apparatus using colors according to the present invention.

FIG. 6 shows an example of a retrieval system including the information comparison display apparatus according to the present invention, with a particular emphasis on the flow of data. In FIG. 6, an information comparison display apparatus 10 is used as part of a retrieval system 11, and performs a process for comparing and displaying pieces of input information which are retrieval result data obtained in the retrieval system 11. Of course, the information comparison display apparatus according to the present invention is not limited to a process for comparing and displaying such retrieval result data, but is also applicable to any input information.

As shown in FIG. 6, an information retrieval process 14 is performed within the retrieval system 11, by using the contents stored in a retrieval object database 12 and a retrieval key 13, and retrieval result data 15 are obtained. The retrieval result data 15 is provided to the information comparison display apparatus 10.

The information comparison display apparatus 10 receives the retrieval result data 15 as comparison display input data 16 to be compared and displayed. Then, the information comparison display apparatus 10 performs a comparing and displaying process 18 by using color setting data 17 corresponding to preset default values, and outputs display data 19. The comparing and displaying process 18 is the central process of the present invention, and is performed by using a basic color pattern 20 and a user-set color pattern 21, which are included in the color setting data 17.

When the information comparison display apparatus 10, as shown in FIG. 6, is not included in the retrieval system 11, but is used independently of the retrieval system 11, pieces of input information, such as character-string information, are provided as the comparison display input data 16 in the form of a file. It is possible to configure the information comparison display apparatus 10 so that the comparing and displaying process 18 is performed by invoking an external program. Color patterns basic to a system are registered as the basic color pattern 20 included in the color setting data 17. A pattern peculiar to a user, together with the user ID, is registered as the user-set color pattern 21 so that the user can freely register a color pattern and change colors.

In general, the selection of a color is highly dependent upon a user's preferences. Therefore, it is necessary to allow a user to freely change the brightness and tone of color in accordance with the user's aim. Users' impressions of a color differ. The impression of color greatly affects the user's understanding particularly when colors of different tones are used along with primary colors. Such a problem can be solved by allowing a user to freely change colors. That is, by allowing a user to freely change colors, each user's preferences can always be reflected in a system, and comparison results can be easily understood. Furthermore, it is also possible to address both a subject common to all users and a subject aimed at a particular user, by separately registering basic color patterns corresponding to default values defined in the system and user-set color patterns indicating each user's preferences.

Figure 7:
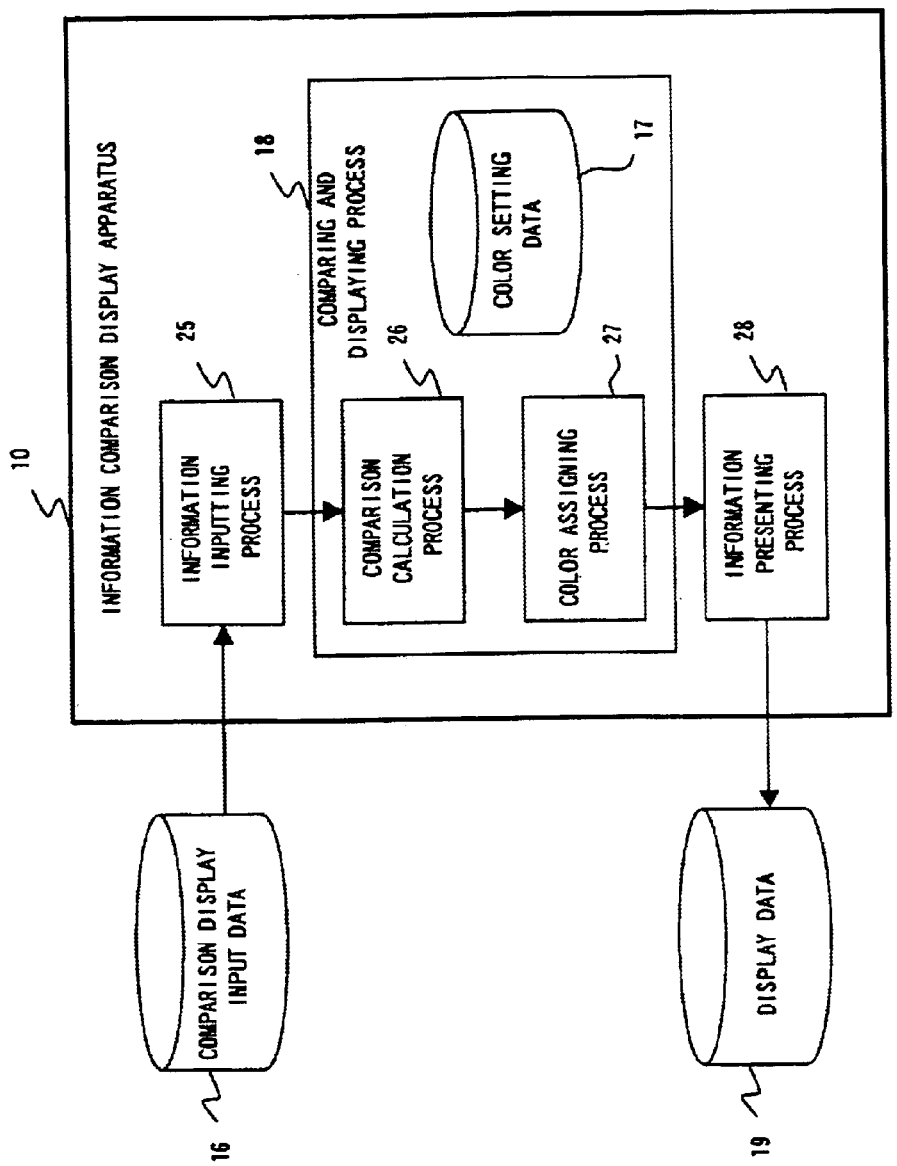
FIG. 7 illustrates processes performed in the information comparison display apparatus using colors, as shown in FIG. 6.

FIG. 7 illustrates processes performed in the information comparison display apparatus 10 shown in FIG. 6. First, an information inputting process 25 is performed to receive the comparison display input data 16, as shown in FIG. 7. In this process, common items, such as common keywords, are extracted as described below. Then, the comparing and displaying process 18 is performed by using the results of the information inputting process 25.

In the comparing and displaying process 18, a comparison calculation process 26 is performed by using the results of the information inputting process 25. In the comparison calculation process 26, color data corresponding to common items such as common keywords, to which a color is to be assigned, are determined. The results of the comparison calculation process 26 are used in a color assigning process 27.

In the color assigning process 27, a color is assigned to a keyword included in input information by using the color setting data 17, based on the determined color data corresponding to a common keyword. The results of the color assigning process 27 are used in an information presenting process 28.

In the information presenting process 28, input information, to which a color has been assigned, is transformed into another form suitable for another system. The results of the information presenting process 28 are outputted as the display data 19.

FIG. 8 is a flowchart showing a flow of an overall process of the information comparison display apparatus using colors, according to the present invention. As shown in FIG. 8, when pieces of character-string information 30 are provided as objects to be compared, the input information processing mechanism performs a process in step S1, and the comparison results calculation mechanism performs a process in step S2. In step S3, a comparison results color assigning mechanism performs a process by using the results of the process performed by the comparison results calculation mechanism and the color setting data 17. In step S4, a color assigned character-string providing mechanism performs a process for outputting character-string information 31, to which a color has been assigned.

Figure 2:
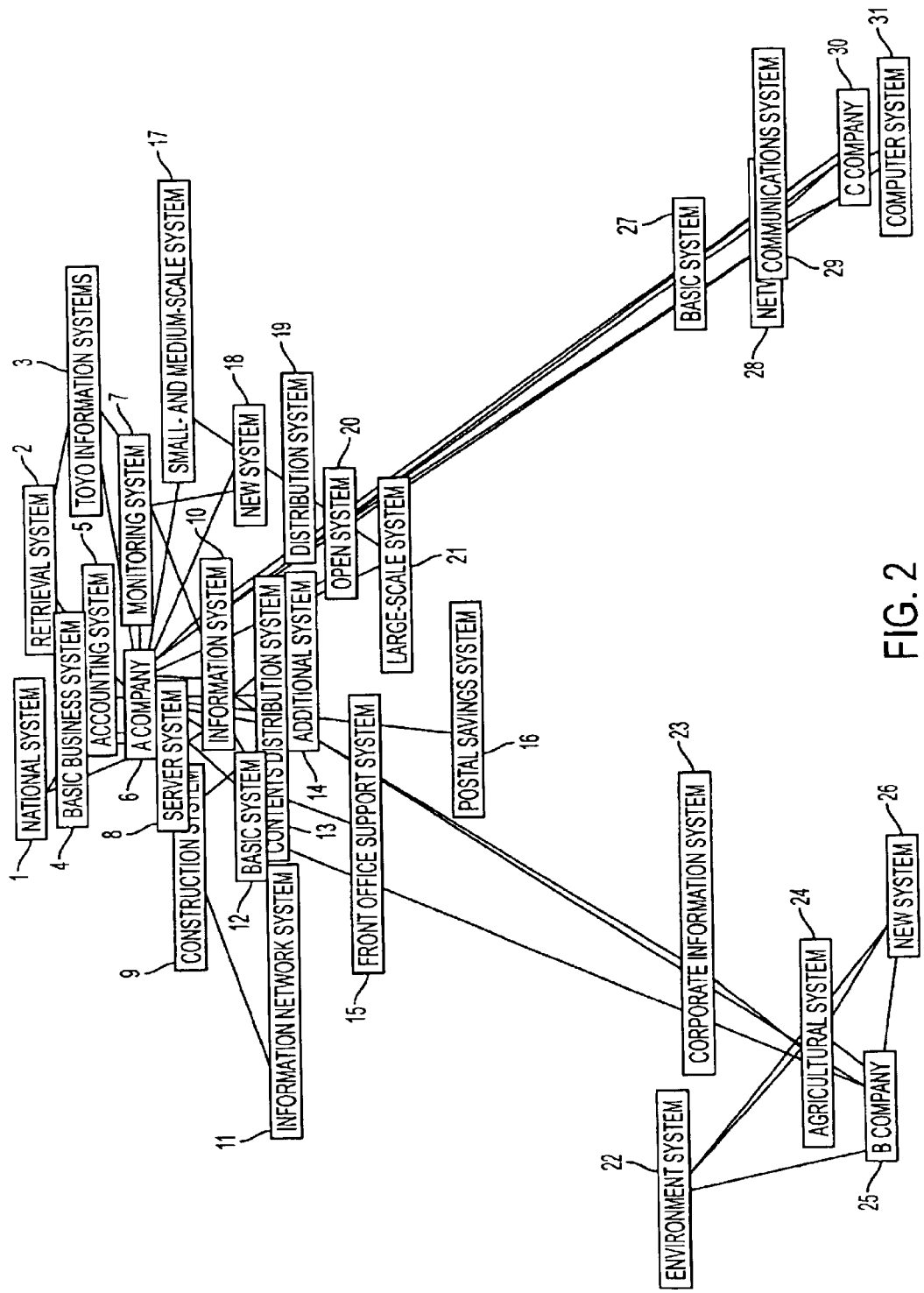
FIG. 2 shows a second example of character-string information.
Figure 3:
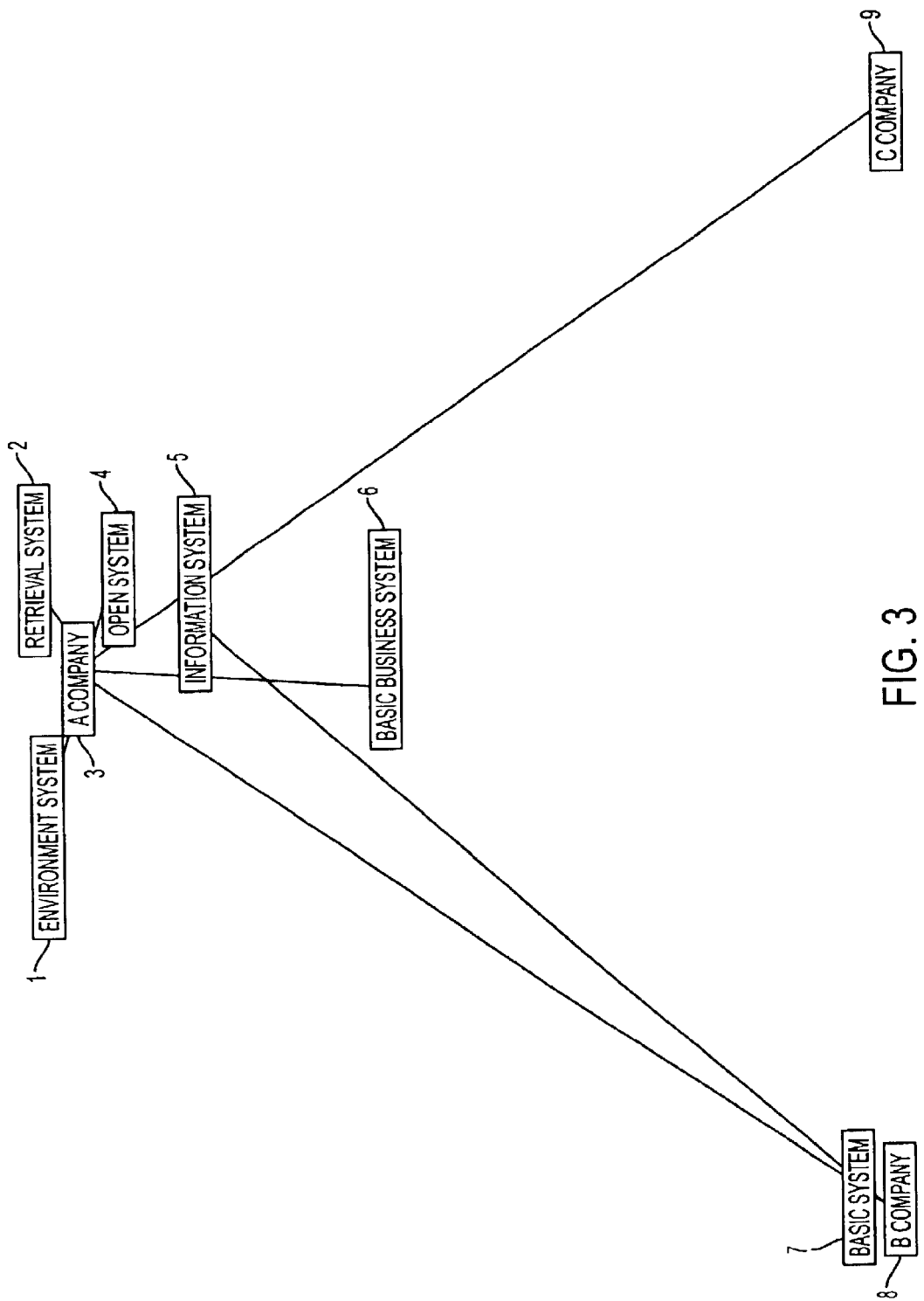
FIG. 3 is a diagram showing a common part of character-string information as shown in FIGS. 1 and 2.
Figure 4:
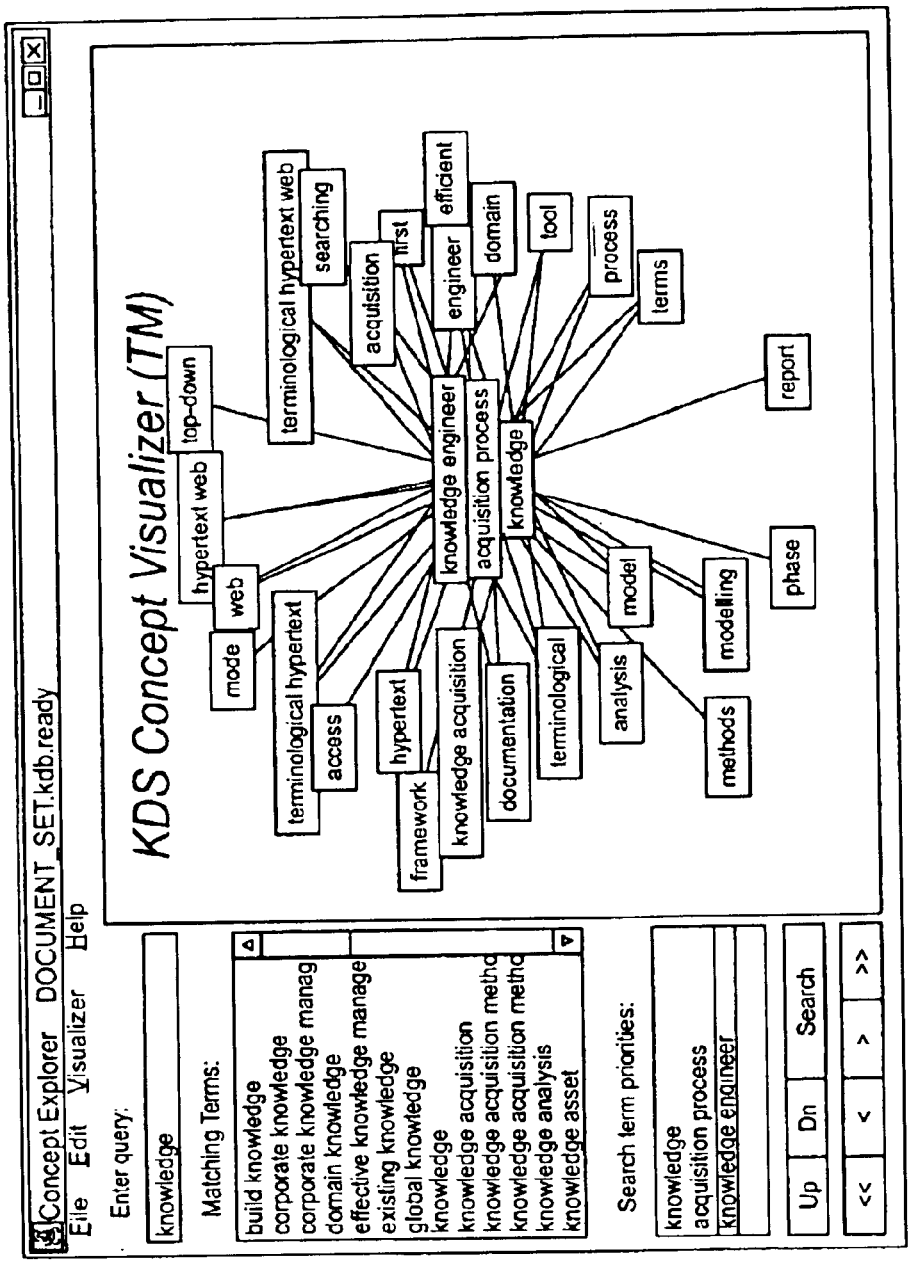
FIG. 4 shows a graphical visualization of the results of comparison between pieces of character-string information, based on the conventional method.
Figure 9:
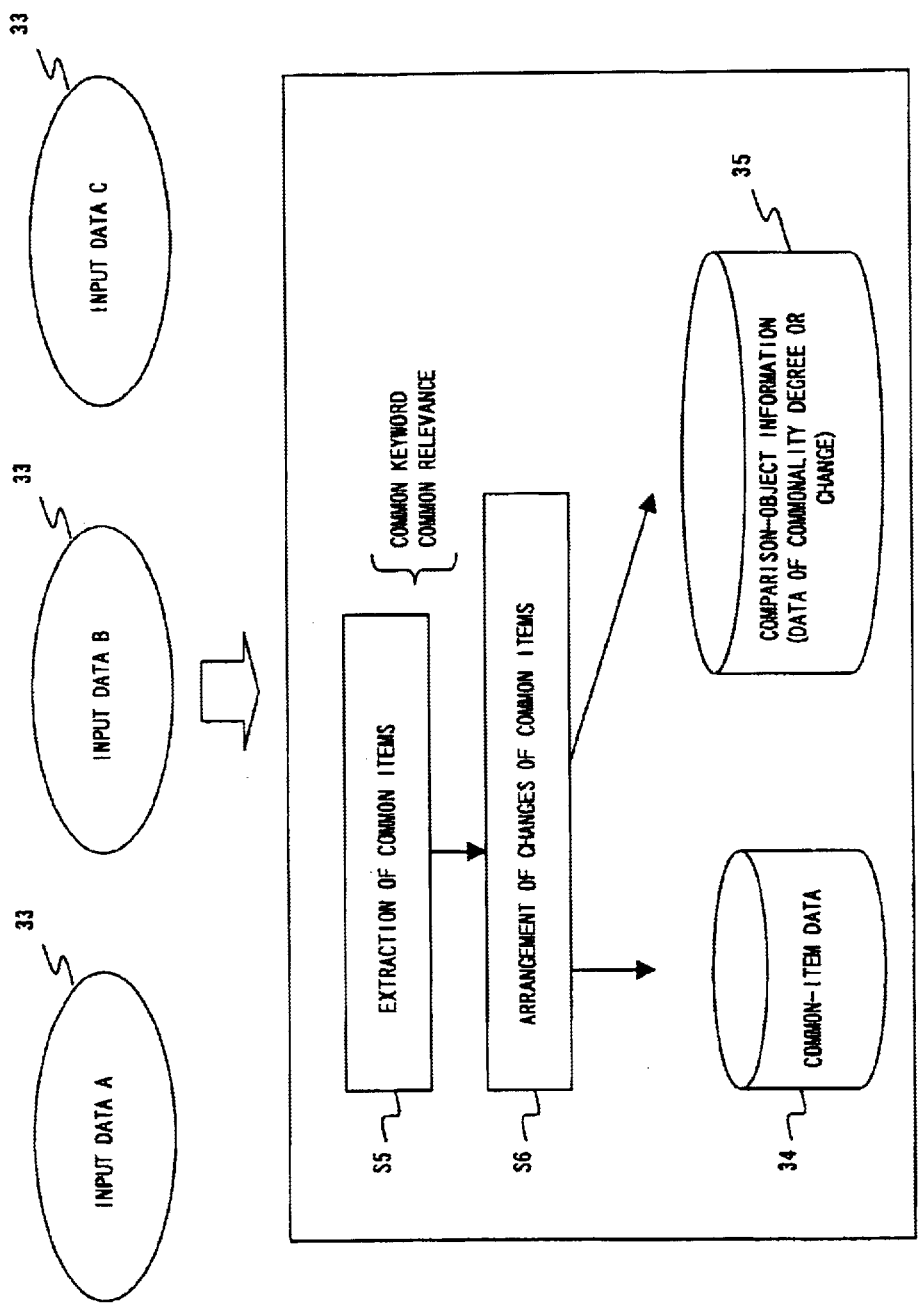
FIG. 9 illustrates the details of an information inputting process.

FIG. 9 illustrates the details of the information inputting process 25 shown in FIG. 7. In the information inputting process as shown in FIG. 9, pieces of input data A, B, C, . . . are received, and items to be compared, for example, common items, are extracted in step S5. Here, a common keyword or common relevance is extracted as a common item. Common relevance refers to a line indicating the relationship between elements of character-string information, which are enclosed in a box in FIGS. 1–3. In the retrieval system as shown in FIG. 6, it is possible to provide the number of common items, such as common keywords, as retrieval result data (ranking data).

Subsequently, in step S6, the arrangement of changes in a common-item attribute value is performed. A change in the common-item attribute value refers to, for example, the difference between the position of a specific element in input data A and that of the same element in input data B.

In the process performed in step S6, common-item data 34 and comparison-object information 35 are obtained. The comparison-object information 35 refers to data of the degree of commonality between common keywords, such as the frequency of occurrence and changes in a position.

Figure 10:
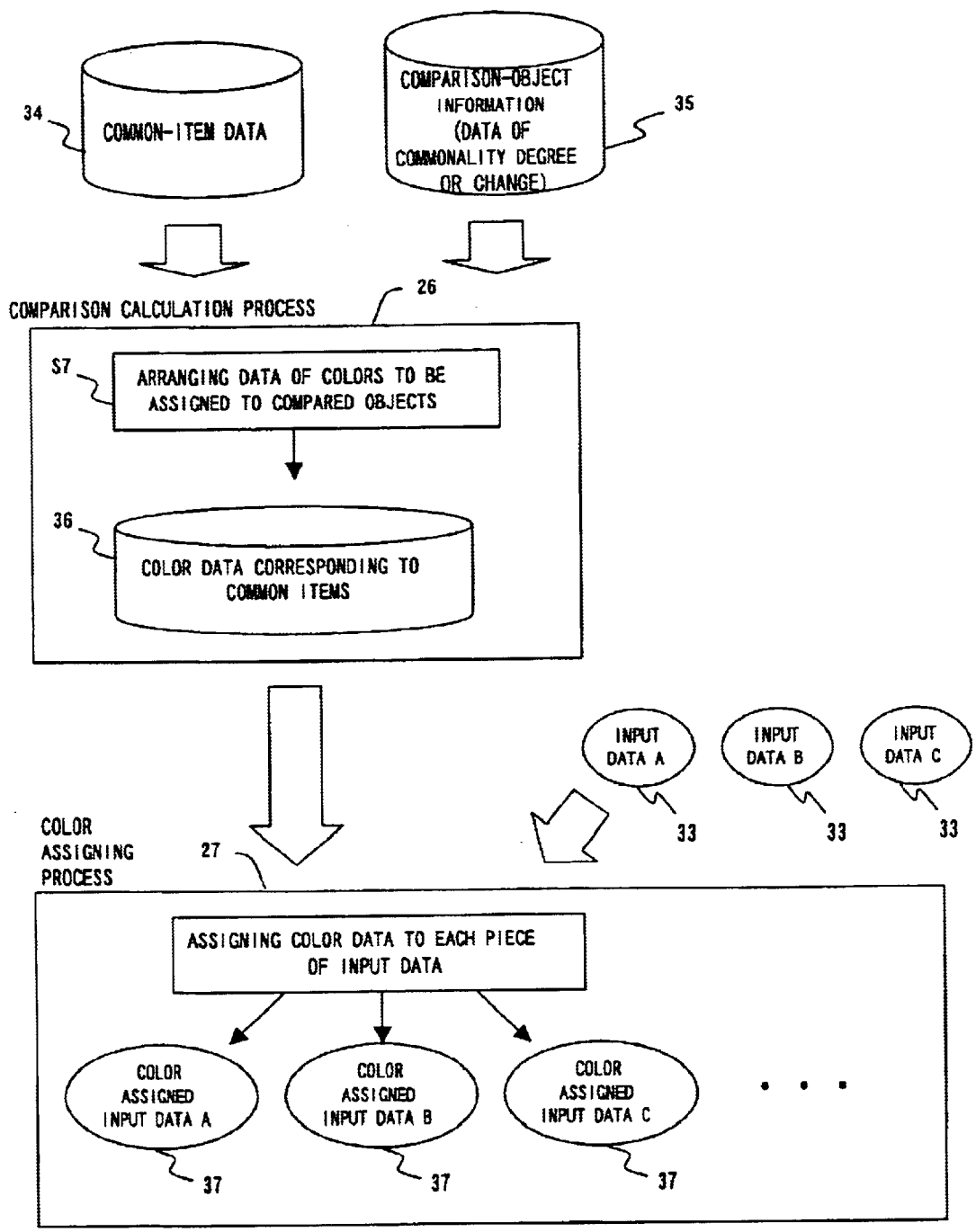
FIG. 10 illustrates the details of a process for comparing and displaying input information.

FIG. 10 illustrates the details of the comparing and displaying process 18 shown in FIG. 7. First, the comparison calculation process 26 is performed, as shown in FIG. 10. In the comparison calculation process 26, the common-item data 34 and the comparison-object information 35, which are obtained in the information inputting process as shown in FIG. 9, are inputted, and common items to be assigned a color are determined based on predetermined comparison criteria. In step S7, a process for arranging color-assignment data is performed, and color data 36 corresponding to the common items are obtained. That is, in step S7, a color is assigned to each of the common items, such as common keywords, resulting in that the color data 36 corresponding to each of the common keywords are obtained.

Next, in the color assigning process 27, a process for assigning color data to each piece of input data is performed, in step S8, by using the color data 36 corresponding to the common items obtained in the comparison calculation process 26 and input data A, B, C, . . . , 33. As a result, color-assigned input data A, B, C, . . . , 37, to which a color has been assigned, are obtained.

Thus, in the present embodiment, a color is not assigned to information newly generated as a result of a comparison between pieces of input data. Instead, color data are assigned to specific keywords included in the pieces of input data, and the color data are outputted.

Figure 11:
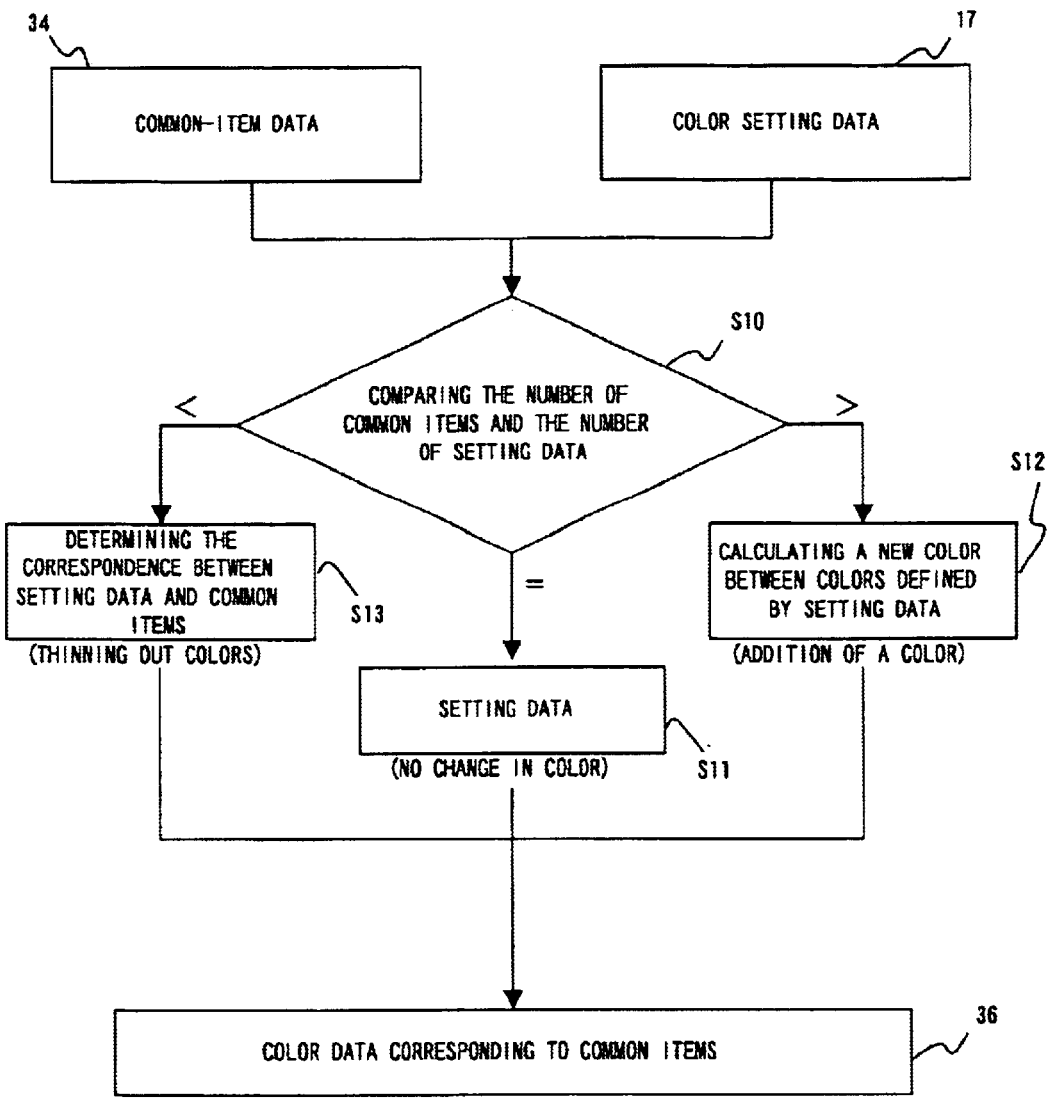
FIG. 11 illustrates a process for arranging color data to be assigned to compared objects.

FIG. 11 is a detailed flowchart of a process for arranging the color-assignment data used for assigning a color to compared objects, which is performed in step S7 shown in FIG. 10. In step S10 shown in FIG. 11, a process for comparing the number of the common items, such as keywords, and the number of pieces of color setting data is performed in response to the input of the common-item data 34 and the color setting data 17. If both the numbers are equal, the color setting data 17 are outputted as the color data 36 corresponding to the common items in step S11, without any addition or change of colors.

If the number of common items is larger than the number of pieces of color setting data, a color is added by performing a calculation regarding the color setting data, and the color data 36 corresponding to the common items are outputted, in step S12. If the number of pieces of color setting data is larger than the number of common items, color setting data corresponding to each of the common items are determined by thinning out colors, and the color data 36 corresponding to the common items are outputted, in step S13.

In cases where the number of common items is larger than the number of pieces of color setting data, the present invention uses neutral colors in addition to primary colors, or produces brightness and darkness in color, resulting in that the transition between a series of related information can be represented by the brightness of color and the tone of color. Furthermore, compared with simply displaying processing results, the transition between a series of related information can be more dynamically represented as a change in color, thereby allowing a transition to be easily estimated and promoting the user's understanding.

Figure 12:
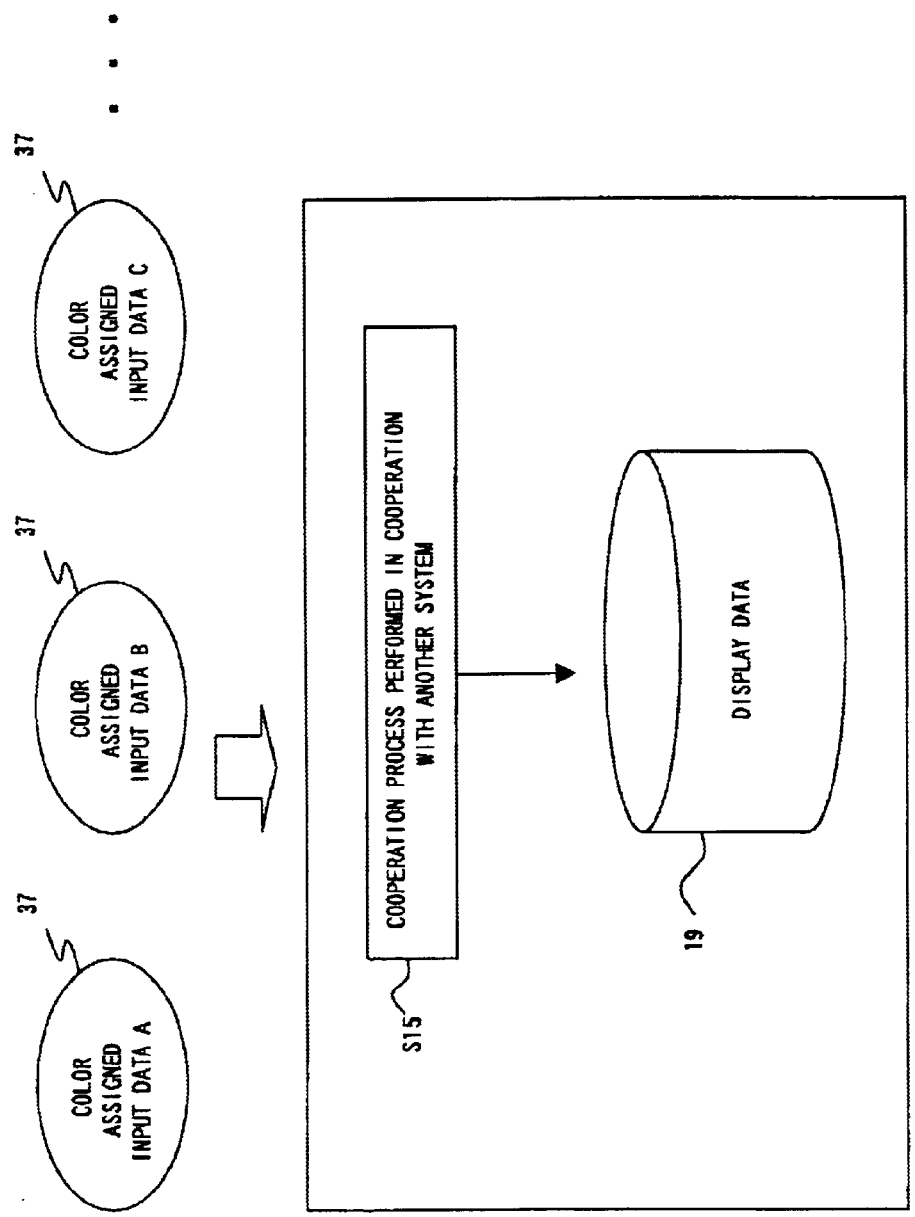
FIG. 12 illustrates the details of a process for presenting information.

FIG. 12 illustrates the details of the information presenting process 28 shown in FIG. 7. In step S15 shown in FIG. 12, in response to the input of the color-assigned input data A, B, C, . . . , 37, which are obtained as a result of the color assigning process 27 as shown in FIG. 10, a cooperation process is performed in cooperation with another system such as a retrieval system, and the display data 19 are outputted. When results are returned to, for example, the retrieval system, a color is assigned to a piece of character-string information selected from among pieces of character-string information, and the piece of character-string information, to which a color has been assigned, is outputted as the display data 19.

FIG. 13 shows the basic data structure of the color setting data 17 as shown in FIGS. 6 and 7. FIG. 13 assumes that three pieces of data are inputted. If a specific keyword appears in only one of the pieces of input data, a base color (system default value) is defined as gray. If the specific keyword appears in two pieces of input data, the base color is defined as blue. If the specific keyword appears in all the three pieces of input data, the base color is defined as red. In cases where four or more pieces of data are inputted, a process for adding a new color must be performed, as shown in FIG. 11. FIG. 13 does not show a data structure applicable to the case of displaying a transition between a series of related information since in such a case, the brightness of color is used as a default value in the present embodiment.

FIG. 14 shows another example of color setting data. FIG. 14 shows a case where the number of input data is N. For a common node which is a keyword appearing in all the N pieces of input data, a base color is defined as red. In a similar manner, for an inherent node which is a keyword appearing in only one of the N pieces of input data, the base color is defined as gray.

FIGS. 13 and 14 suppose that the base color of color data is uniquely determined according to the frequency of occurrences indicating the number of pieces of input data which include a specific keyword. However, particularly in cases where a large number of pieces of data are inputted, color data can also be set by converting the frequency of occurrence of a keyword in actual input data, which indicates the number of pieces of input data which include the keyword, into an occurrence frequency specifically designed for determining a base color in the system as shown in FIG. 13 or 14, instead of directly using the frequency of occurrence of the keyword in the actual input data for determining a base color.

Figure 15:
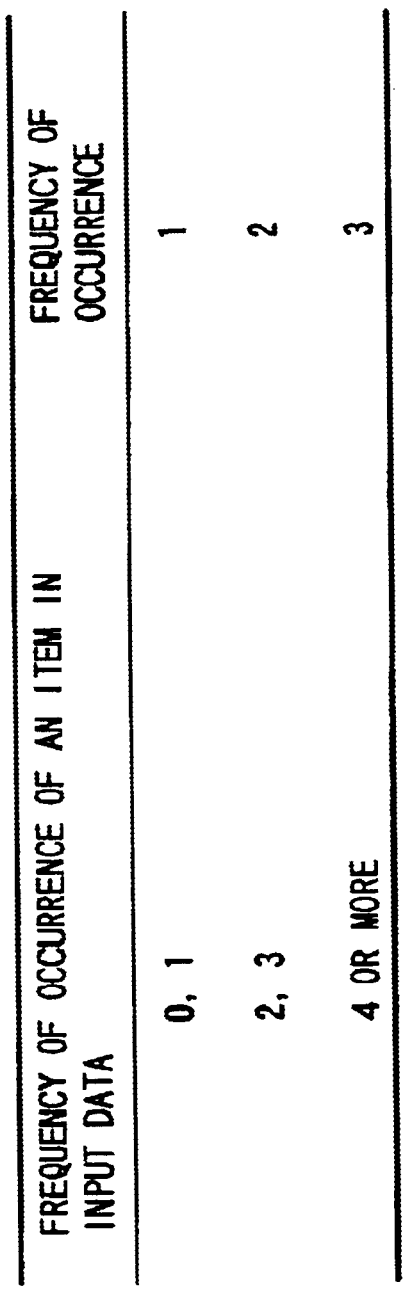
FIG. 15 shows an example of converting the frequency of occurrence of an item in actual input data, into an occurrence frequency to be used for determining a base color.

FIG. 15 shows an example of such a conversion. FIG. 15 shows a case where four or more pieces of data are inputted. For a keyword which does not appear in any input data and a keyword which appears in only one of the pieces of input data, the occurrence frequency for determining a base color is defined as 1.

Figure 16:
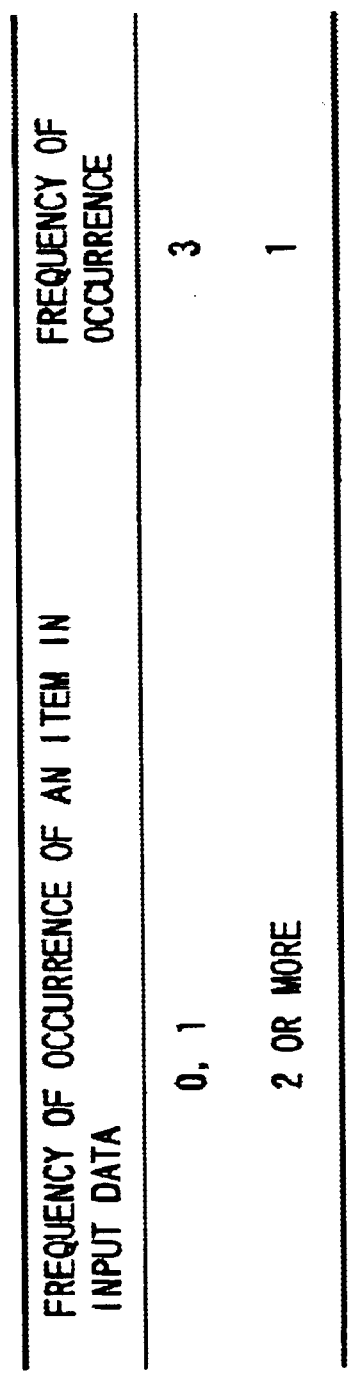
FIG. 16 shows another example of converting the frequency of occurrence of an item in input data, into an occurrence frequency to be used for determining a base color.

FIG. 16 shows an example of a correspondence between the frequency of occurrence of an item in input data and the occurrence frequency used for determining a base color in a system in a case where the frequency of occurrence of the item in the input data is small and is converted into a larger number. In FIG. 16, for a keyword which does not appear in any input data and a keyword which appears in only one of the pieces of input data, the occurrence frequency used in a system for determining a base color is defined as 3. For example, in the case as shown in FIG. 13, red is used as a base color.

Figure 1:
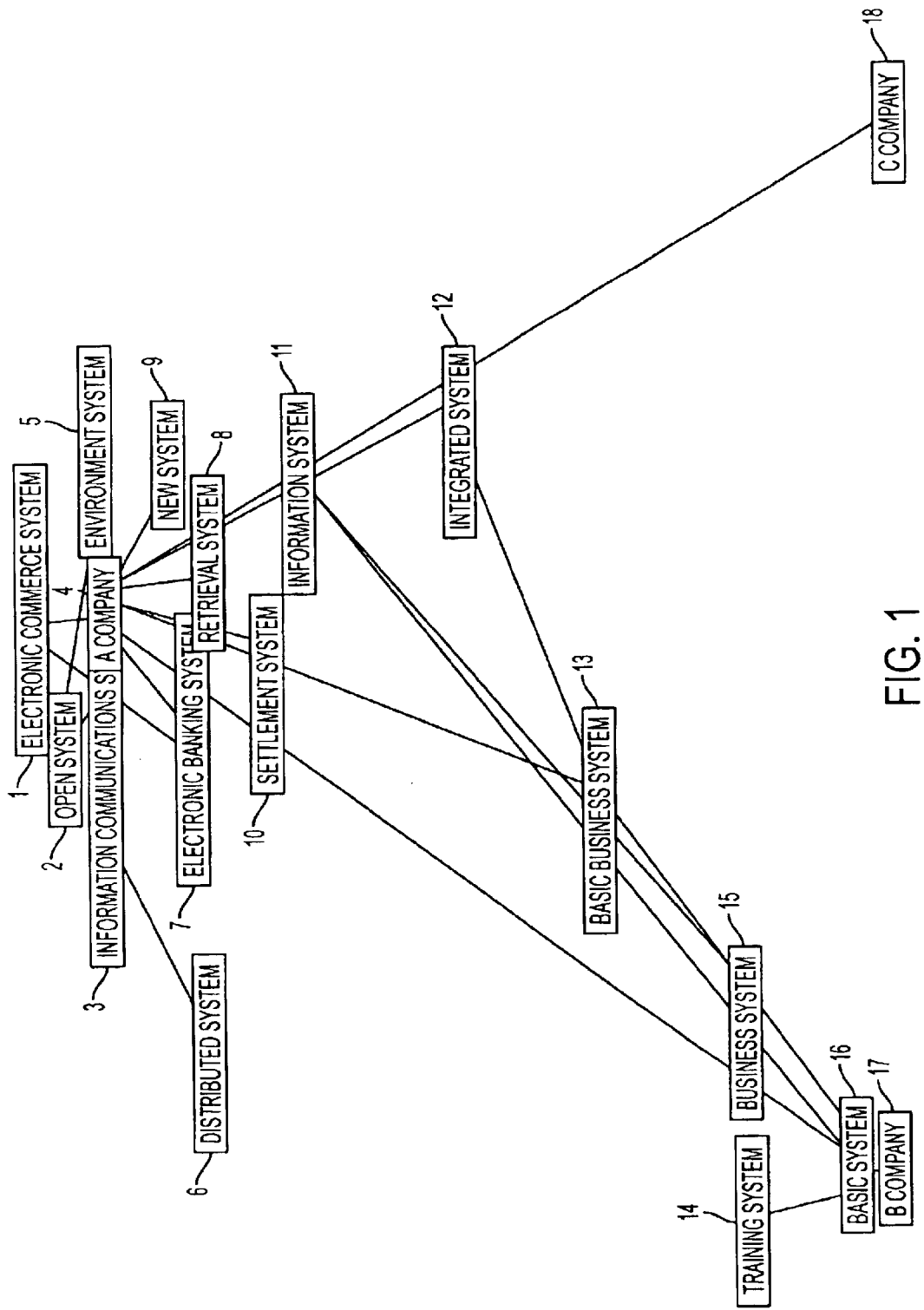
FIG. 1 shows a first example of character-string information.
Figure 17:
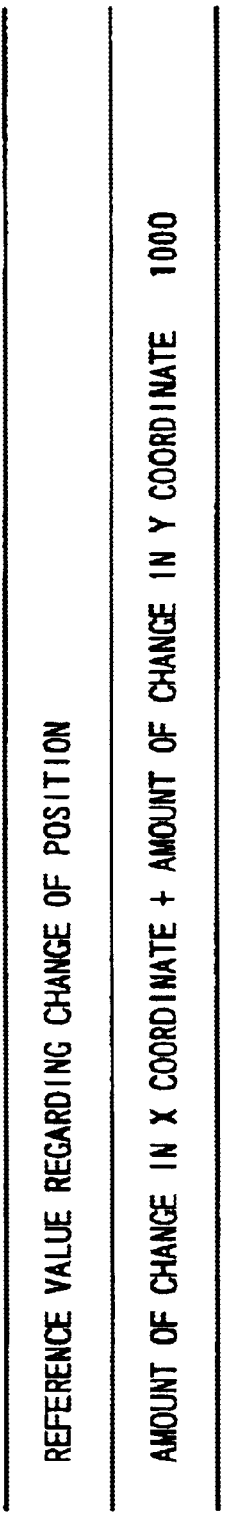
FIG. 17 shows a reference value in the case of assigning a color to a common item, the position of which has been changed.

In the present embodiment, a color is assigned to a common item such as a keyword, which is an element of input data, when the amount of change in the position of the common item exceeds a reference value, as shown in FIG. 17. For example, a predetermined color is assigned when the sum of changes in the x and y coordinates of the position of a specific keyword exceeds 1,000. In such a case, the results of comparison regarding quantity, such as the number of keywords, cannot be represented along with changes of a position. However, the results of comparison regarding quantity can be represented by, for example, transforming a box enclosing an element, as shown in FIG. 1, into an ellipse.

Figure 18:
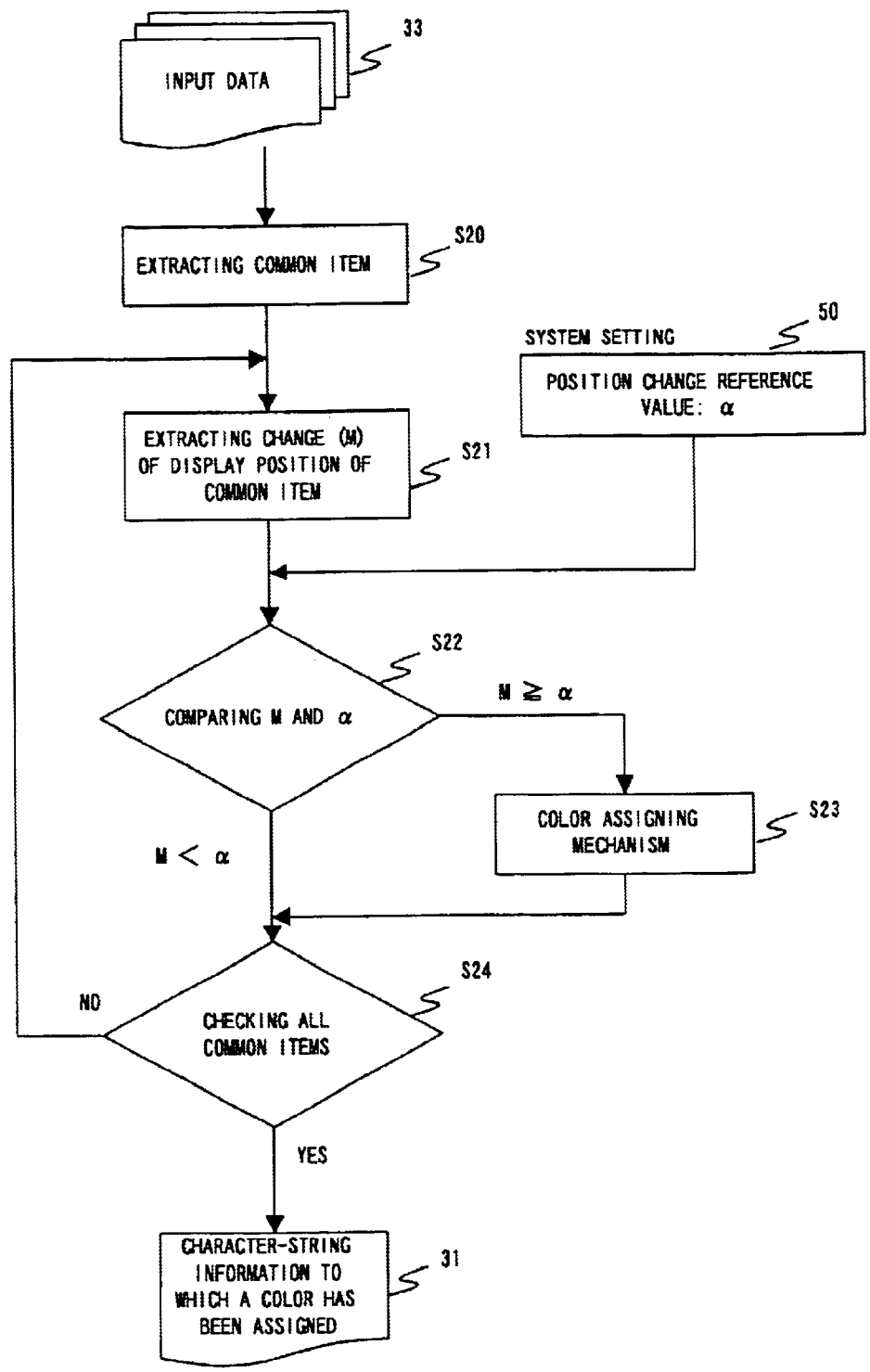
FIG. 18 is a flowchart of a process for assigning a color to a common item in the case where the amount of change of a position exceeds the reference value.

FIG. 18 is a flowchart of a process for assigning a color to, for example, a keyword in the case where the amount of change of a position exceeds the reference value, as shown in FIG. 17. In the process as shown in FIG. 18, common items are extracted from the pieces of input data 33 in step S20. In step S21, an amount M of change in the coordinates of the position of each of the common items, such as a keyword, is extracted. In step S22, the amount M is compared with a reference value α regarding change of a position, which is predetermined in the system.

If the amount M of change of the position of the keyword is equal to or greater than the reference value α in step S22, a process for assigning a color to the keyword is performed by the color assigning mechanism in step S23 and then, control is passed to step S24. If the amount M of change of the position of the keyword is less than the reference value α in step S22, control is immediately passed to step S24, and whether all the common items, such as keywords, have been checked is determined. If it is determined that some of the common items have not been checked yet, the processes performed in and after step S21 are repeated. When it is determined that all the common items have been checked, the character-string information 31, to which a color has been assigned, is outputted.

Figure 19:
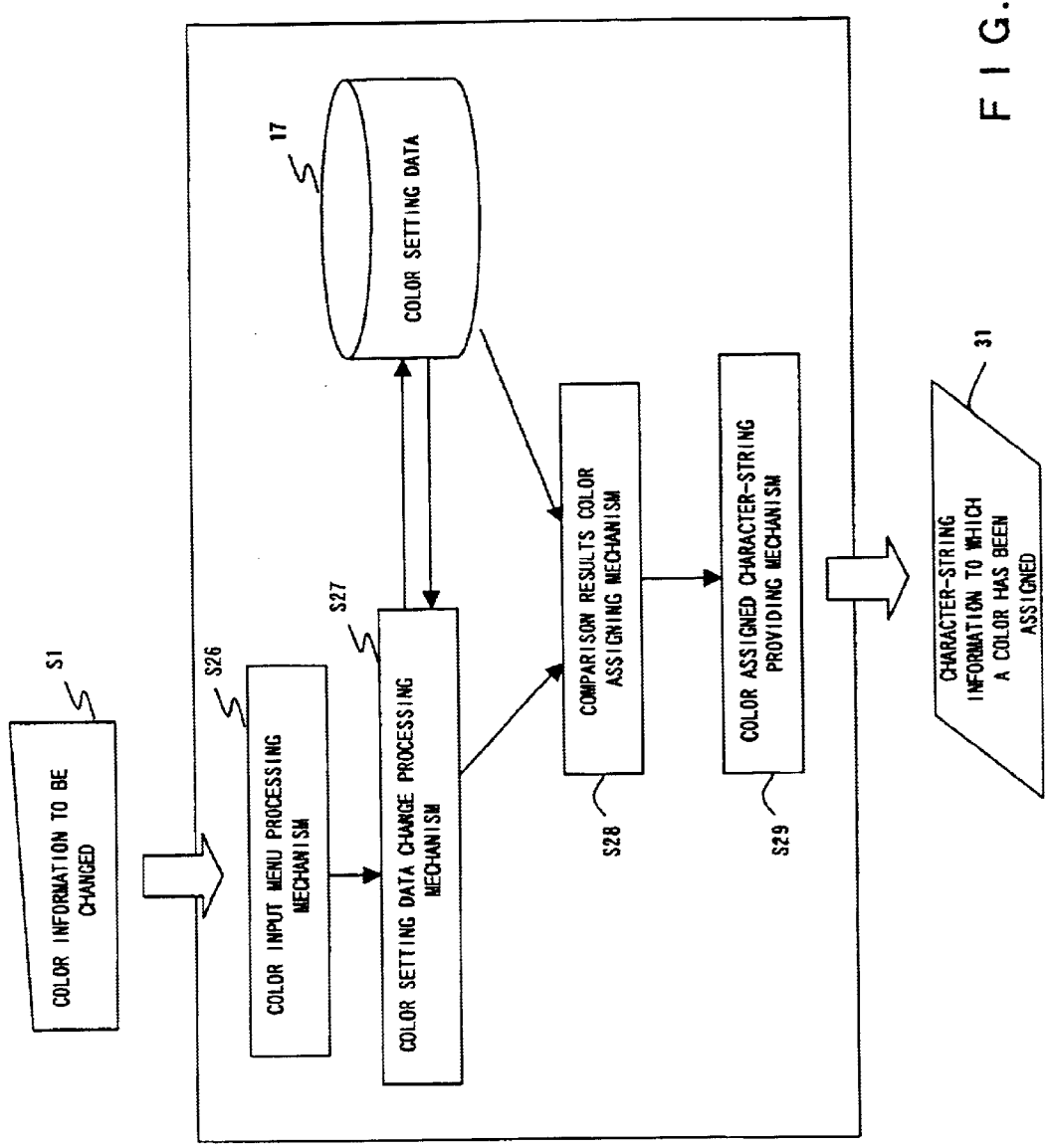
FIG. 19 is a flowchart of a process in which a user changes color setting data.

FIG. 19 is a flowchart of a process in which a user changes color setting data. In the present embodiment, a user can freely select and change colors in accordance with the user's preferences.

In the process as shown in FIG. 19, color information 51 specifying a color, to which a current color is to be changed, is provided from a user. In step S26, the user inputs the color information 51 by selecting an item from a color input menu. The inputted color information 51 is processed by a color input menu processing mechanism. In step S27, a corresponding part of the color setting data 17 is changed by a color setting data changing mechanism. In step S28, a comparison result color assigning mechanism performs a process for retrieving an object character string from memory (not shown in the drawings) and for assigning a new color to the object character string included in the comparison results, by using the results of the process performed in step S27. In step S29, a color-assigned character string providing mechanism performs a process for outputting the character-string information 31, to which a color has been assigned.

Figure 20:
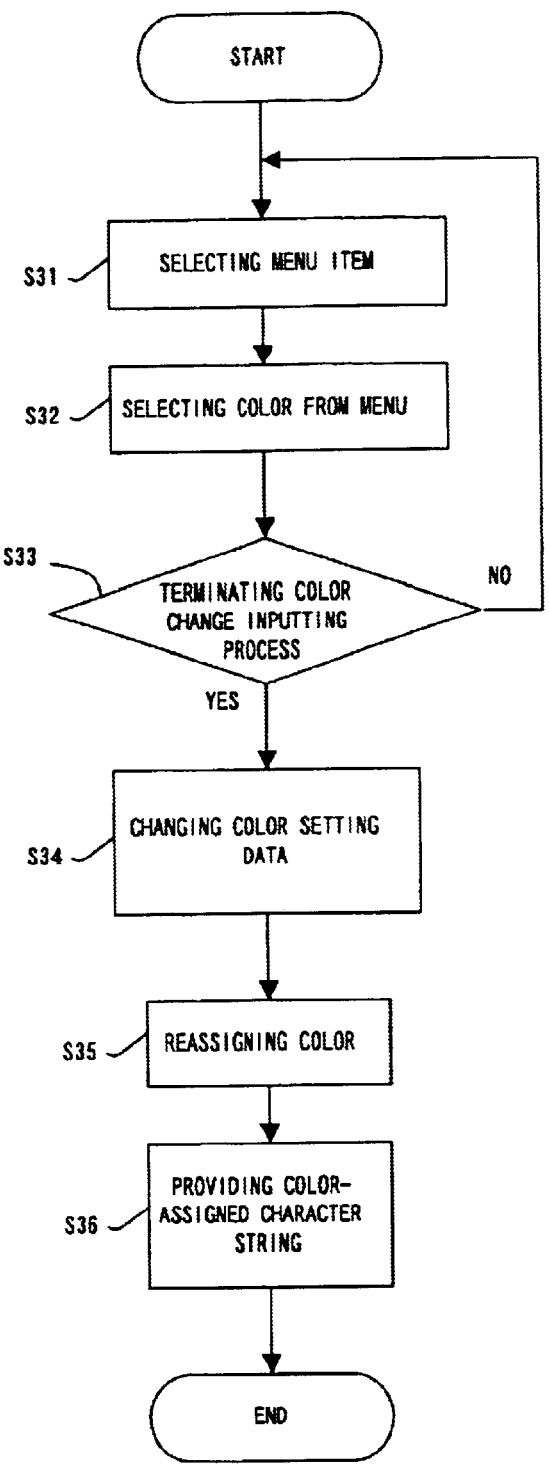
FIG. 20 is a detailed flowchart of a color changing process.

FIG. 20 is a detailed flowchart of a color changing process. When the process as shown in FIG. 20 is started, a menu item is selected in step S31. For example, color data, which correspond to an occurrence frequency N and are stored in the user-set color pattern 21 as shown in FIG. 6, are selected. In step S32, a color, to which the current color is to be changed, is selected by selecting an item from a color menu. In step S33, whether a color change inputting process has been completed is determined. If it is determined that the color change inputting process has not been completed yet, the processes performed in and after step S31 are repeated.

When it is determined that the color change inputting process has been completed, the color setting data are actually changed in step S34. In step S35, an object character string is retrieved from memory, and the selected color is newly assigned to the retrieved character string. In step S36, the character string, to which the color has been assigned, is presented, resulting in that the color changing process is terminated.

FIG. 21 illustrates a process for automatically registering a color. As explained above with reference to FIG. 6, the color setting data 17 includes the basic color pattern 20, which corresponds to a default value defined in the system, and the user-set color pattern 21, which a user can freely define or change. The contents of the user-set color pattern 21 can be freely changed by a user, as explained above with reference to FIGS. 19 and 20. In the process for automatically registering a color as shown in FIG. 21, a history of changes in the color setting data made by a user are stored, and color data of the basic color pattern, which corresponds to a default value defined in the system, is automatically updated by using the stored history of changes.

In the process as shown in FIG. 21, when the color setting data changing mechanism performs a process corresponding to step S27, as shown in FIG. 19, the contents of the color setting data 17, that is, the user-set color pattern 21 are changed. Then, a history storing mechanism performs a process for storing a history of changes as history registration data 52 in step S38. In step S39, a history checking mechanism performs a process for checking the history of changes, and the color setting data, that is, the basic color pattern 20 (the default value of the system) is automatically changed if this is necessary.

Figure 22:
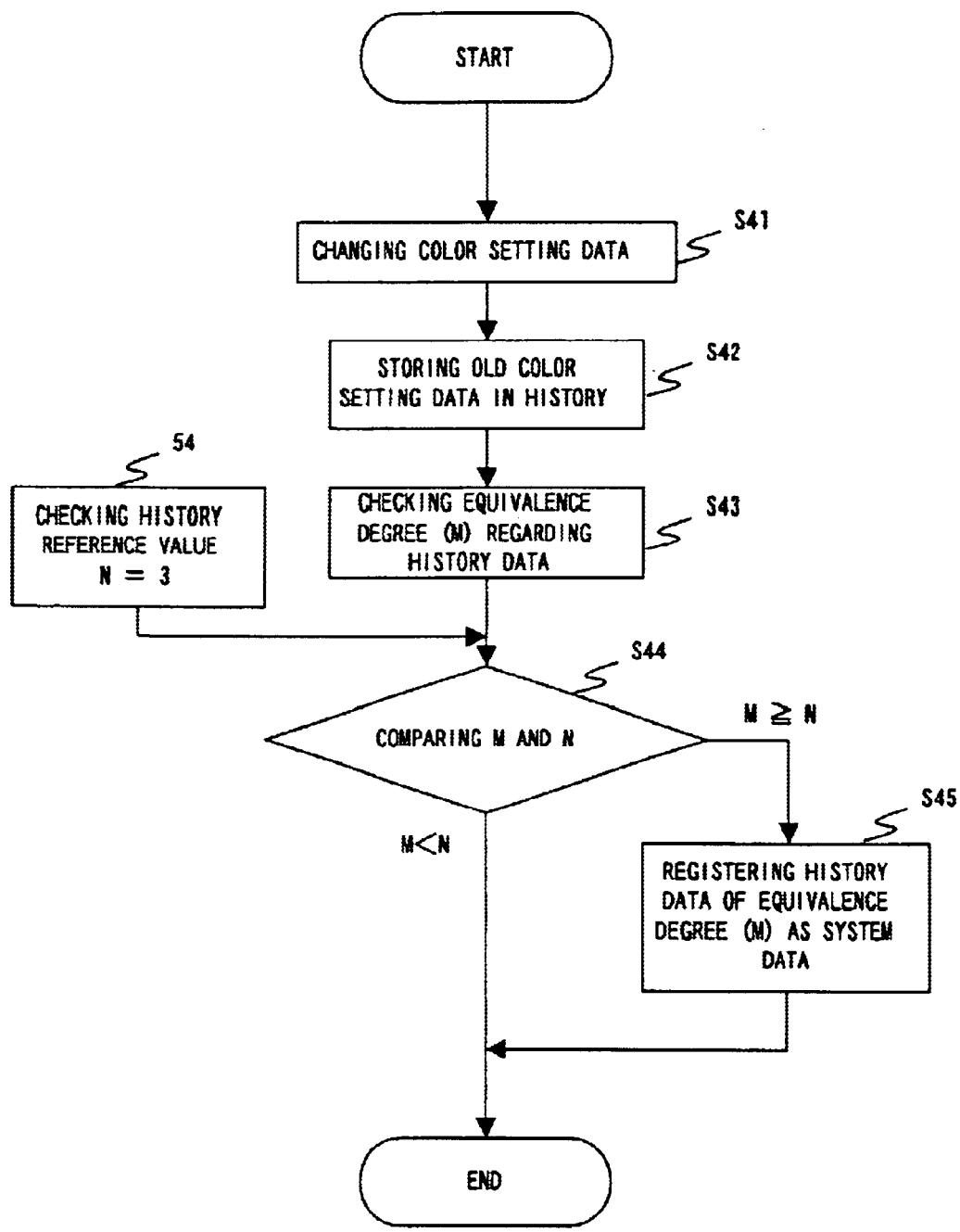
FIG. 22 is a detailed flowchart of the process for automatically registering a color.

FIG. 22 is a detailed flowchart of the process for automatically registering a color. When the process as shown in FIG. 22 is started, the color setting data are changed in step S41. In step S42, the old color setting data which are unchanged are stored as the history registration data 52 as shown in FIG. 21. In step S43, a process for checking an equivalence degree M indicating the number of times the original color appears in the history registration data is performed.

In the present embodiment, a reference value N is defined as 3, the reference value N being used for determining whether to perform a process for automatically updating color data, by checking the history. In step S44, the values of M and N are compared. If M is equal to or greater than N, history data of the equivalence degree M are registered, in step S45, as system data, that is, a default value in the basic color pattern 20 as shown in FIG. 6 and then, the process for automatically registering a color is terminated. If M is less than N, the process for automatically registering a color is terminated immediately.

In the present embodiment, the color setting data 17 includes the basic color pattern 20, which corresponds to a default value defined in the system, and the user-set color pattern 21, which a user can freely define or change, as described above. Suppose that according to the mood of the moment, a user assigns different colors to common items which appear a specific number of times. If the user often assigns red to such common items appearing the specific number of times, it can be said that the user considers red suitable for common items appearing the specific number of times. Therefore, in such a case, red is registered as the basic color pattern 20 which is color setting data corresponding to the default value of the system.

In the embodiment of the present invention, so as to allow a user to easily understand the results of comparison between a series of character-string information, colors corresponding to the states of transition or change of the series of related information are determined by performing a calculation regarding gradations in color between colors defined as default values of the system, based on the number of the states, and the colors determined as a result of the calculation are assigned to the states, as described above. In principle, transitions, that is, comparison results seen from different points of view can be simultaneously displayed by using intermediate colors. The use of colors eliminates confusion in understanding displayed information, thereby allowing a user to easily and intuitively understand the comparison results.

However, in fact, simultaneously displaying a transition between a series of related information, the number of which is larger than that of primary colors, often causes confusion. If a plurality of similar colors are used, it is difficult to distinguish between displayed items. Therefore, it is necessary to separately output data of a transition, to which a color has been assigned, for each transition to be definitely displayed. In cases where a user desires comparison from a plurality of points of view, it is difficult to simultaneously display the results of such a comparison. However, the result of comparison between pieces of input information, seen from a plurality of points of view, can be displayed by changing color transition patterns.

The method of using colors in the present embodiment can be summarized as follows.

The following three methods are used for comparing pieces of input information, which are not a series of related information, so as to examine the difference between the pieces of input information. That is, the following three methods put emphasis on the correspondence between the pieces of input information:

A-1: Assign a specific color to a common element, and use gradations in color according to the degree of commonality.

A-2: Assign a color to a specific item so as to contrast the specific item with input information to be highlighted.

A-3: Assign a specific color to an element which is not a common element, so as to clarify a peculiar and characteristic part of input information.

The following methods are used for comparing pieces of input information involving a transition, such as time-series information, so as to examine the difference between the pieces of input information. That is, the following methods put emphasis on common items and the state of a transition between them rather than the correspondence between the pieces of input information:

B-1: Assign a color to a common element, and represent the state of a transition by using gradations in color, with regard to common quantity.

B-2: Assign a color to part of a series of related information, and use gradations in color for representing states on the time series.

B-3: Assign a specific color to an element which newly appears or disappears.

B-4: Assign a color to a characteristic element, the attribute (arrangement, the frequency of occurrence, etc.) of which greatly changes, and use gradations in color according to the degree of change.

B-5: Assign a color to an element, the attribute of which does not change.

A concrete example of these methods is explained with reference to FIGS. 23–26.

Figure 23:
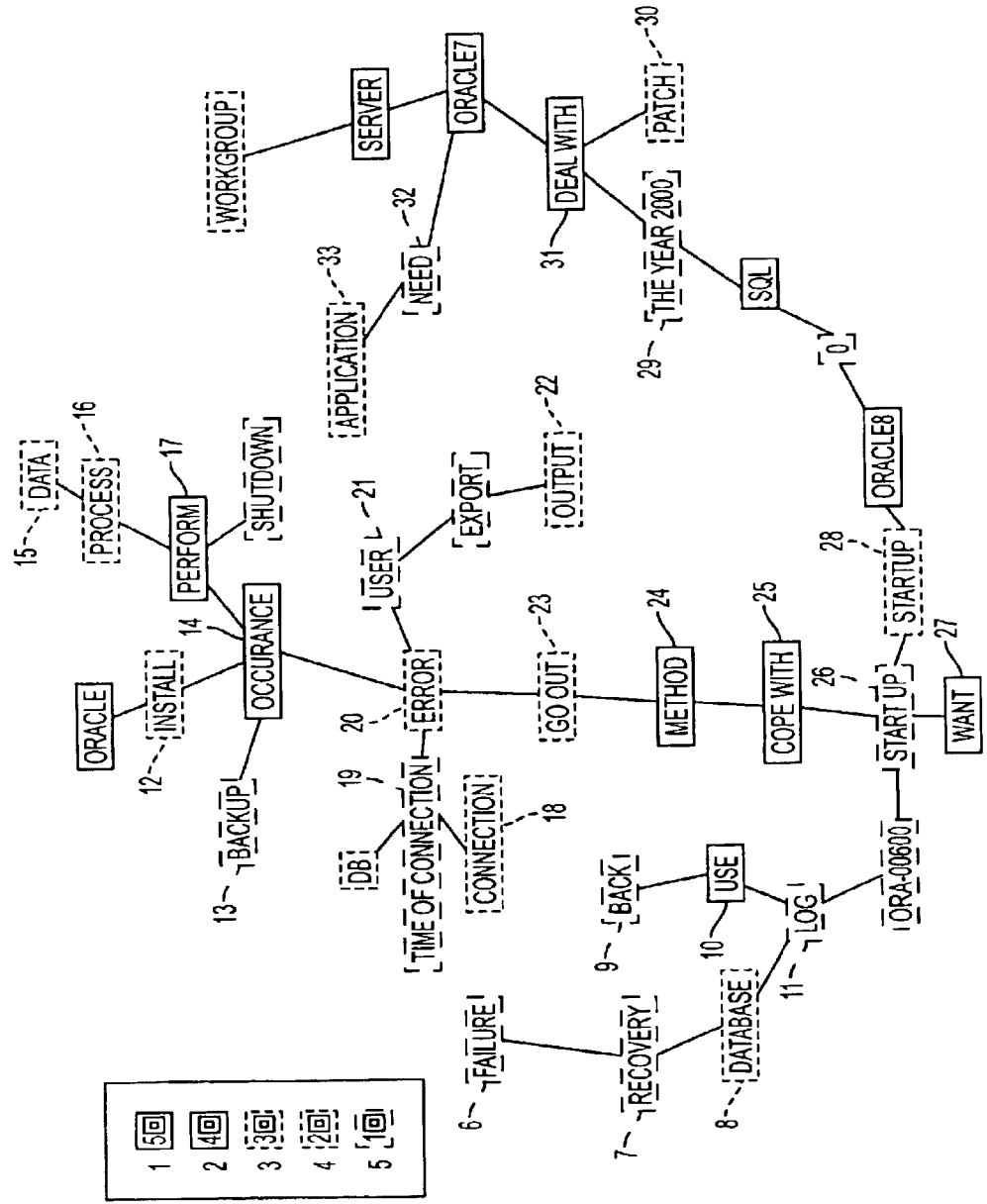
FIG. 23 shows a first concrete example of an A-1 color-using method.
Figure 24:
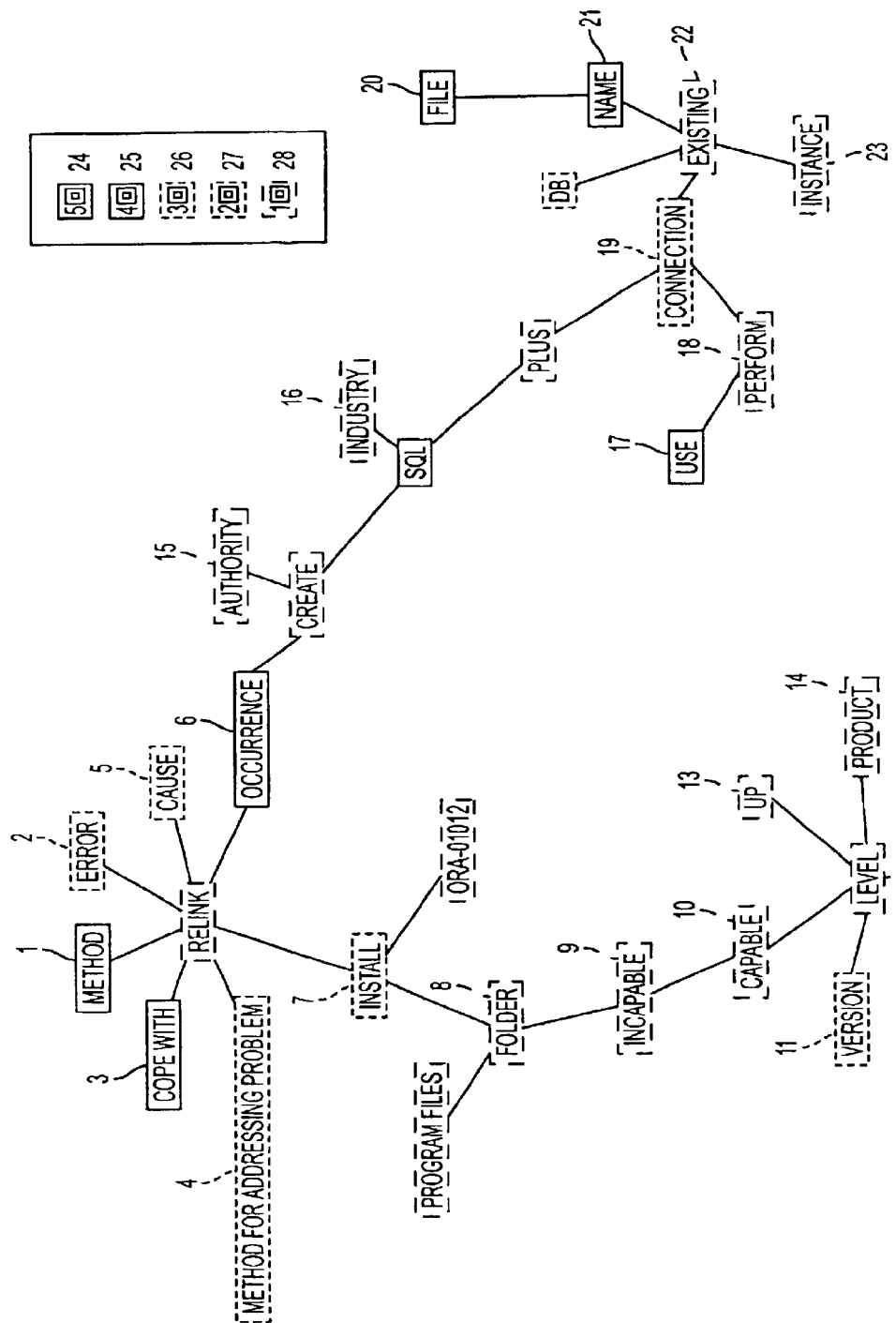
FIG. 24 shows a second concrete example of the A-1 color-using method.

FIGS. 23 and 24 show a concrete example of using method A-1. In FIGS. 23 and 24, dotted lines and, brightness and darkness are used instead of colors. Keywords, such as "occurrence", "method", "cope with", and "deal with", are enclosed in a red box (a black box in FIG. 23), which indicates an occurrence frequency of 5. Keywords, such as "ORACLE", "OPACLE7", "ORACLE8", and "SQL", are enclosed in a bright green box (a gray box in FIG. 23), which indicates an occurrence frequency of 4. Keywords, such as "error", "patch", and "startup", are enclosed in a green box (a black box drawn with a dotted line in FIG. 23), which indicates an occurrence frequency of 3. Keywords, such as "connection", "DB", "data", and "database", are enclosed in a yellow box (a gray box drawn with a dotted line in FIG. 23), which indicates an occurrence frequency of 2. Keywords, such as "backup", "user", "log", and "the year 2000", are enclosed in a gray box (a gray box drawn with a broken line in FIG. 23), which indicates an occurrence frequency of 1.

In FIG. 24, colors are assigned in a manner similar to how they are assigned in FIG. 23. Keywords, such as "method", "cope with", and "occurrence", are enclosed in a red box (a black box in FIG. 24). The keyword "file" is enclosed in a bright green box (a gray box in FIG. 24). Keywords, such as "error", "cause", and "install", are enclosed in a green box (a black box drawn with a dotted line in FIG. 24). Keywords, such as "version" and "DB", are enclosed in a yellow box (a gray box drawn with a dotted line in FIG. 24). Keywords, such as "authority", "folder", and "industry", are enclosed in a gray box (a gray box drawn with a broken line in FIG. 24).

Figure 25:
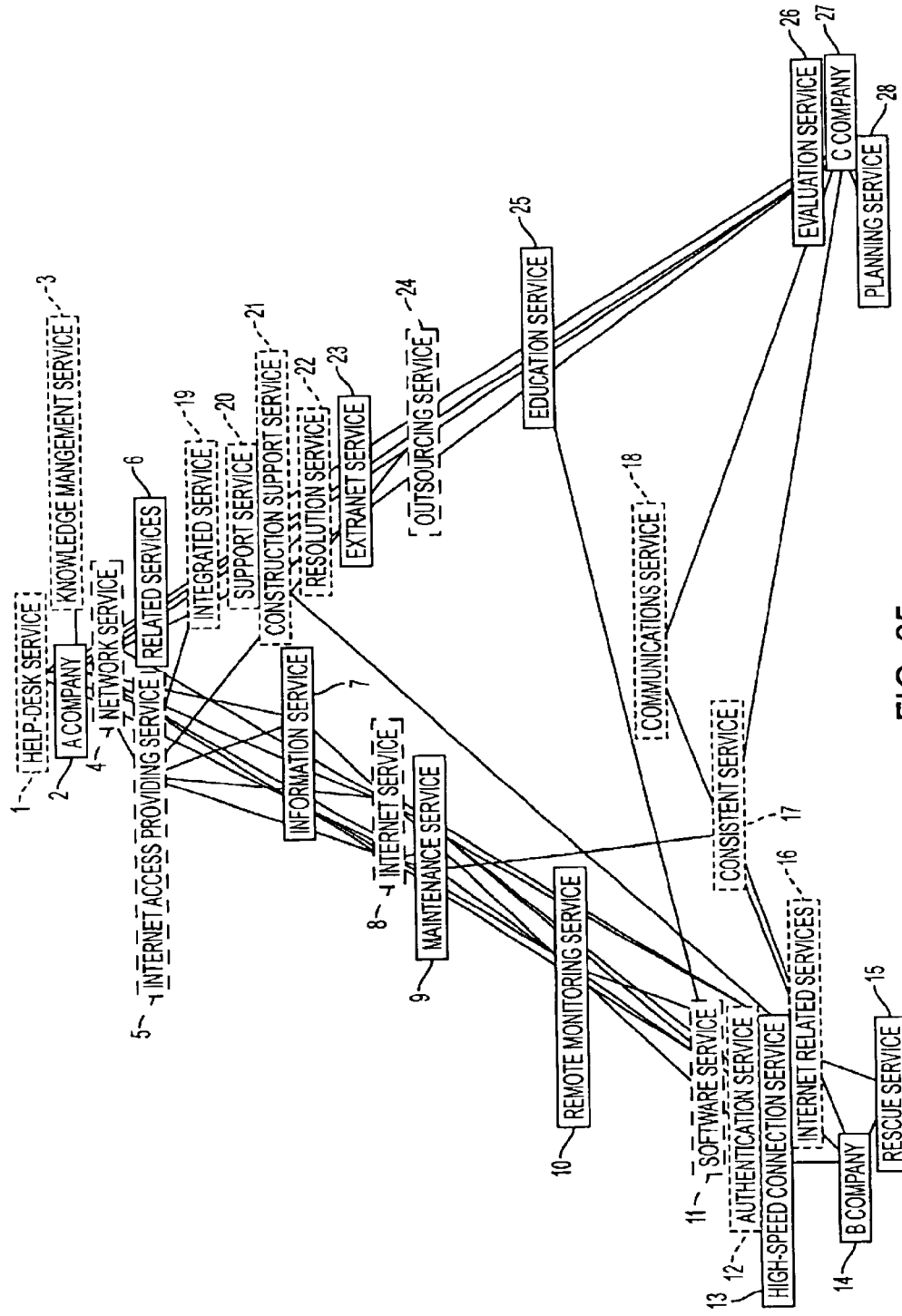
FIG. 25 shows a first concrete example of a B-1 color-using method.
Figure 26:
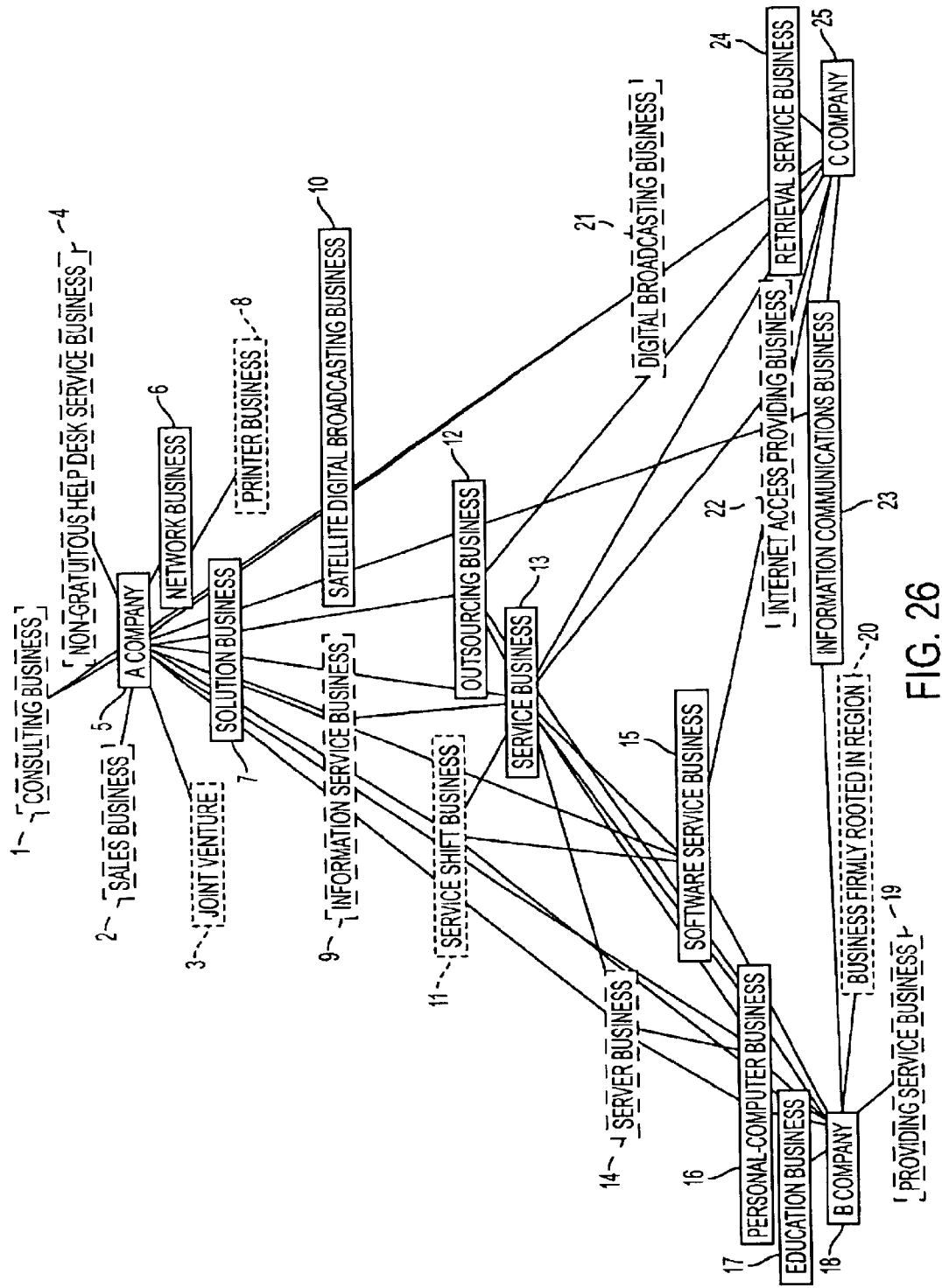
FIG. 26 shows a second concrete example of the B-1 color-using method.

FIGS. 25 and 26 show a concrete example of using method B-1. FIG. 25 shows elements included in three pieces of time-series input data corresponding to the first half of 1998, the second half of 1998, and the first half of 1999. Elements which are common to all the three pieces of time-series input data, such as "Internet service", "outsourcing service", and "software service", are enclosed in a blue box (a gray box drawn with a broken line in FIG. 25). Elements which are common to two of the three pieces of time-series input data, such as "information service", "maintenance service", "education service", and "extranet service", are enclosed in a green box (a black box in FIG. 25). Elements appearing in only one of the three pieces of time-series input data, such as "help-desk service", "knowledge management service", and "communications service", are enclosed in a yellow box (a black box drawn with a dotted line in FIG. 25).

In FIG. 26, colors are assigned in a manner similar to how they are assigned in FIG. 25. Elements which are common to all the three pieces of time-series input data, such as "outsourcing business", "service business", and "software service business", are enclosed in a blue box (a black box in FIG. 26). Elements which are common to two of the three pieces of time-series input data, such as "sales business", "information service business", and "digital broadcasting business", are enclosed in a green box (a gray box drawn with a broken line in FIG. 26). Elements appearing in only one of the three pieces of time-series input data, such as "joint venture", "service shift business", and "Internet access providing business", are enclosed in a yellow box (a black box drawn with a dotted line in FIG. 26).

In conclusion, the loading of a program into a computer, according to an embodiment of the present invention, is explained. The information comparison display apparatus using colors, according to the present invention, can be implemented by using a general computer as shown in FIG. 27. A computer 60, as shown in FIG. 27, consists of a main unit 61 and memory 62. In the case of implementing a retrieval system as shown in FIG. 6, the retrieval object database 12, the retrieval result data 15, the comparison display input data 16, the color setting data 17, and the display data 19 are stored in the memory 62, and the information retrieval process 14 and the comparing and displaying process 18 are executed by the main unit 61.

A program as set forth in claim 12 of the present invention and programs for implementing the processes as shown in FIGS. 7–12 and 18–22 are stored in the memory 62. A process for comparing and displaying pieces of input data by using colors is executed by the main unit 61 running these programs.

The memory 62 can be memory in various forms, such as random access memory (RAM), a hard disk, an optical disk, and a magneto-optic disk.

It is also possible to configure the apparatus according to the present invention so that these programs are stored on a portable storage medium 63, which is commercially available, and are run after being loaded into the computer 60 or these programs are sent from a program provider through a line 64 and loaded into the computer 60. The portable storage medium 63 can be a commercially available storage medium in various forms, such as a floppy disk, a CD-ROM, an optical disk, and a magneto-optic disk.

As explained above in detail, the present invention compares pieces of input information, and displays the pieces of input information after assigning colors to them according to the results of comparison, resulting in that the results of comparison between the pieces of input information can be clearly visualized and presented to a user.

Particularly, in cases where results are graphically displayed, the present invention allows a user to intuitively understand the difference between pieces of input information. Furthermore, in cases where a series of related information such as time-series information are inputted and compared, the present invention displays the results of comparison by using gradations in color, thereby allowing a user to easily understand transition between the series of related information. In general, the impression of the same color differs from one user to another. However, the present invention can meet the needs or preferences of each user by preparing color setting patterns for each user, thereby greatly increasing the practicality of an information comparison display apparatus.

What is claimed is:

1. An information comparison display apparatus for displaying results of comparison between a plurality of pieces of input information by using a plurality of colors, comprising:

an input information processing unit receiving the pieces of input information;

an information comparing unit comparing the pieces of input information based on a plurality of predetermined comparison criteria, and determining a plurality of characteristic elements to be assigned colors;

a color assigning unit assigning colors corresponding to a plurality of preset default values or colors defined by each user to the pieces of input information, based on the results of comparison;

a color-assigned information providing unit outputting the information, to which the colors have been assigned, to the outside;

a color changing unit changing a color defined by a user to another color in response to data entry by the user; and an automatic color registering unit resetting a default value corresponding to the changed color, based on a history of color changes performed by said color changing unit.

2. An information comparison display apparatus for displaying results of comparison between a plurality of pieces of input information by using a plurality of colors, comprising:

an input information processing unit receiving the pieces of input information;

an information comparing unit comparing the pieces of input information based on a plurality of predetermined comparison criteria, and determining a plurality of characteristic elements to be assigned colors;

a color assigning unit assigning colors corresponding to a plurality of preset default values or colors defined by each user to the pieces of input information, based on the results of comparison; and a color-assigned information providing unit outputting the information, to which the colors have been assigned, to the outside, and wherein the pieces of input information are a series of related information, and wherein said color assigning unit assigns the colors to the series of related information, according to an amount of change in attributes of the series of related information, including change of a display position of an element of the series of related information, based on the results of comparison between the series of related information.

3. An information comparison display apparatus for displaying results of comparison between a plurality of pieces of input information by using a plurality of colors, comprising:

an input information processing unit receiving the pieces of input information;

an information comparing unit comparing the pieces of input information based on a plurality of predetermined comparison criteria, and determining a plurality of characteristic elements to be assigned colors;

a color assigning unit assigning colors corresponding to a plurality of preset default values or colors defined by each user to the pieces of input information, based on the results of comparison; a color-assigned information providing unit outputting the information, to which the colors have been assigned, to the outside; and a color-assignment data arranging unit selecting a new color, or thinning out the preset default values or data of the colors defined by each user when the number of the colors corresponding to the preset default values or the colors defined by each user does not agree with the number of colors required to display the results of comparison so that these numbers agree.

4. An information comparison display method, comprising:

allowing a user to designate an analysis relationship for target character strings in an input source;

analyzing the input source for the target character strings responsive to the relationship; and displaying the input source to the user with the target character strings having the relationship displayed with colors assigned responsive to the degree of the relationship.

5. A method as recited in claim 4, wherein the relationship is a frequency of occurrence.

6. A method as recited in claim 4, wherein the relationship is a common occurrence in plural input sources.

7. A method as recited in claim 4, wherein the relationship is change of position of the strings within the input source.

8. A method as recited in claim 4, wherein the relationship is a designation of one or more character strings by the user.

* * * * *